(12) United States Patent
Hughes et al.

(10) Patent No.: US 11,868,449 B2
(45) Date of Patent: *Jan. 9, 2024

(54) DYNAMIC MONITORING AND AUTHORIZATION OF AN OPTIMIZATION DEVICE

(71) Applicant: Hewlett Packard Enterprise Development LP, Houston, TX (US)

(72) Inventors: David Anthony Hughes, Los Altos Hills, CA (US); Damon John Ennis, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 420 days.

This patent is subject to a terminal disclaimer.

(21) Appl. No.: 17/139,795

(22) Filed: Dec. 31, 2020

(65) Prior Publication Data

US 2021/0173901 A1 Jun. 10, 2021

Related U.S. Application Data

(63) Continuation of application No. 16/875,866, filed on May 15, 2020, now Pat. No. 10,885,156, which is a
(Continued)

(51) Int. Cl.
*G06F 21/12* (2013.01)
*H04L 9/40* (2022.01)
*G06F 21/10* (2013.01)

(52) U.S. Cl.
CPC .............. *G06F 21/12* (2013.01); *H04L 63/02* (2013.01); *H04L 63/10* (2013.01); *H04L 63/102* (2013.01);
(Continued)

(58) Field of Classification Search
CPC . G06F 21/12; G06F 2221/0775; H04L 63/02; H04L 63/10; H04L 63/102; H04L 63/0281; H04L 63/164
See application file for complete search history.

(56) References Cited

U.S. PATENT DOCUMENTS 4,494,108 A 1/1985 Langdon et al.
4,558,302 A 12/1985 Welch
(Continued)

FOREIGN PATENT DOCUMENTS

| EP | 1507353 A2 | 2/2005 |
|---|---|---|
| JP | 05-061964 A | 3/1993 |
| WO | 01/35226 A1 | 5/2001 |

OTHER PUBLICATIONS

Business Wire, ""Silver Peak Systems Delivers Family of Appliances for Enterprise-Wide Centralization of Branch Office Infrastructure; Innovative Local Instance Networking Approach Overcomes Traditional Application Acceleration Pitfalls"" (available at http://www.businesswire.com/news/home/20050919005450/en/Silver-Peak-Systems-Delivers-Family-Appliances-Enterprise-Wide#.UVzkPk7u-1.
(Continued)

*Primary Examiner* — Jason Chiang
(74) *Attorney, Agent, or Firm* — Hewlett Packard Enterprise Patent Department

(57) ABSTRACT

Disclosed is a system and method for the monitoring and authorization of an optimization device in a network. In exemplary embodiments, an optimization device transmits an authorization request message to a portal to receive authorization to operate. The portal transmits an authorization response message to the optimization device with capability parameters for operation of the device, including at least one expiration parameter for the authorization. The optimization device sends updated authorization request
(Continued)

messages to the portal with its device usage information, such that the portal can dynamically monitor the optimization device and continue to authorize its operation.

20 Claims, 9 Drawing Sheets

Related U.S. Application Data continuation of application No. 15/856,669, filed on Dec. 28, 2017, now Pat. No. 10,719,588, which is a continuation of application No. 14/479,131, filed on Sep. 5, 2014, now Pat. No. 9,875,344.

(52) U.S. Cl.
CPC ...... *G06F 21/1078* (2023.08); *H04L 63/0281* (2013.01); *H04L 63/164* (2013.01)

(56) References Cited

U.S. PATENT DOCUMENTS

| | | | |
|---|---|---|---|
| 4,612,532 A | 9/1986 | Bacon et al. |
| 5,023,611 A | 6/1991 | Chamzas et al. |
| 5,159,452 A | 10/1992 | Kinoshita et al. |
| 5,243,341 A | 9/1993 | Seroussi et al. |
| 5,307,413 A | 4/1994 | Denzer |
| 5,357,250 A | 10/1994 | Healey et al. |
| 5,359,720 A | 10/1994 | Tamura et al. |
| 5,373,290 A | 12/1994 | Lempel et al. |
| 5,483,556 A | 1/1996 | Pillan et al. |
| 5,532,693 A | 7/1996 | Winters et al. |
| 5,592,613 A | 1/1997 | Miyazawa et al. |
| 5,602,831 A | 2/1997 | Gaskill |
| 5,608,540 A | 3/1997 | Ogawa |
| 5,611,049 A | 3/1997 | Pitts |
| 5,612,682 A * | 3/1997 | DeLuca ............... H04W 12/06 340/5.31 |
| 5,627,533 A | 5/1997 | Clark |
| 5,635,932 A | 6/1997 | Shinagawa et al. |
| 5,652,581 A | 7/1997 | Furlan et al. |
| 5,659,737 A | 8/1997 | Matsuda |
| 5,675,587 A | 10/1997 | Okuyama et al. |
| 5,710,562 A | 1/1998 | Gormish et al. |
| 5,748,122 A | 5/1998 | Shinagawa et al. |
| 5,754,774 A | 5/1998 | Bittinger et al. |
| 5,802,106 A | 9/1998 | Packer |
| 5,805,822 A | 9/1998 | Long et al. |
| 5,883,891 A | 3/1999 | Libove et al. |
| 5,903,230 A | 5/1999 | Masenas |
| 5,955,976 A | 9/1999 | Heath |
| 6,000,053 A | 12/1999 | Levine et al. |
| 6,003,087 A | 12/1999 | Housel et al. |
| 6,054,943 A | 4/2000 | Lawrence |
| 6,081,883 A | 6/2000 | Popelka et al. |
| 6,084,855 A | 7/2000 | Soirinsuo et al. |
| 6,175,944 B1 | 1/2001 | Urbanke et al. |
| 6,191,710 B1 | 2/2001 | Waletzki |
| 6,240,463 B1 | 5/2001 | Benmohamed et al. |
| 6,295,541 B1 | 9/2001 | Bodnar et al. |
| 6,308,148 B1 | 10/2001 | Bruins et al. |
| 6,311,260 B1 | 10/2001 | Stone et al. |
| 6,339,616 B1 | 1/2002 | Kovalev |
| 6,374,266 B1 | 4/2002 | Shnelvar |
| 6,434,191 B1 | 8/2002 | Agrawal et al. |
| 6,434,641 B1 | 8/2002 | Haupt et al. |
| 6,434,662 B1 | 8/2002 | Greene et al. |
| 6,438,664 B1 | 8/2002 | McGrath et al. |
| 6,452,915 B1 | 9/2002 | Jorgensen |
| 6,453,305 B1 | 9/2002 | Glassman et al. |
| 6,463,001 B1 | 10/2002 | Williams |
| 6,489,902 B2 | 12/2002 | Heath |
| 6,493,698 B1 | 12/2002 | Boris |
| 6,570,511 B1 | 5/2003 | Cooper |
| 6,587,985 B1 | 7/2003 | Fukushima et al. |
| 6,614,368 B1 | 9/2003 | Cooper |
| 6,618,397 B1 | 9/2003 | Huang |
| 6,633,953 B2 | 10/2003 | Stark |
| 6,643,259 B1 | 11/2003 | Borella et al. |
| 6,650,644 B1 | 11/2003 | Colley et al. |
| 6,653,954 B2 | 11/2003 | Rijavec |
| 6,667,700 B1 | 12/2003 | McCanne et al. |
| 6,674,769 B1 | 1/2004 | Viswanath |
| 6,718,361 B1 | 4/2004 | Basani et al. |
| 6,728,840 B1 | 4/2004 | Shatil et al. |
| 6,738,379 B1 | 5/2004 | Balazinski et al. |
| 6,754,181 B1 | 6/2004 | Elliott et al. |
| 6,769,048 B2 | 7/2004 | Goldberg et al. |
| 6,791,945 B1 | 9/2004 | Levenson et al. |
| 6,823,470 B2 | 11/2004 | Smith et al. |
| 6,839,346 B1 | 1/2005 | Kametani |
| 6,842,424 B1 | 1/2005 | Key et al. |
| 6,856,651 B2 | 2/2005 | Singh |
| 6,859,842 B1 | 2/2005 | Nakamichi et al. |
| 6,862,602 B2 | 3/2005 | Guha |
| 6,910,106 B2 | 6/2005 | Sechrest et al. |
| 6,963,980 B1 | 11/2005 | Mattsson |
| 6,968,374 B2 | 11/2005 | Lemieux et al. |
| 6,978,384 B1 | 12/2005 | Milliken |
| 7,007,044 B1 | 2/2006 | Rafert et al. |
| 7,020,750 B2 | 3/2006 | Thiyagarajan et al. |
| 7,035,214 B1 | 4/2006 | Seddigh et al. |
| 7,047,281 B1 | 5/2006 | Kausik |
| 7,069,268 B1 | 6/2006 | Burns et al. |
| 7,069,342 B1 | 6/2006 | Biederman |
| 7,110,407 B1 | 9/2006 | Khanna |
| 7,111,005 B1 | 9/2006 | Wessman |
| 7,113,962 B1 | 9/2006 | Kee et al. |
| 7,114,070 B1 | 9/2006 | Willming et al. |
| 7,120,666 B2 | 10/2006 | McCanne et al. |
| 7,145,889 B1 | 12/2006 | Zhang et al. |
| 7,149,953 B2 | 12/2006 | Cameron et al. |
| 7,177,295 B1 | 2/2007 | Sholander et al. |
| 7,197,597 B1 | 3/2007 | Scheid et al. |
| 7,200,847 B2 | 4/2007 | Straube et al. |
| 7,215,667 B1 | 5/2007 | Davis |
| 7,216,283 B2 | 5/2007 | Shen et al. |
| 7,242,681 B1 | 7/2007 | Van et al. |
| 7,243,094 B2 | 7/2007 | Tabellion et al. |
| 7,249,309 B2 | 7/2007 | Glaise et al. |
| 7,266,645 B2 | 9/2007 | Garg et al. |
| 7,278,016 B1 | 10/2007 | Detrick et al. |
| 7,318,100 B2 | 1/2008 | Demmer et al. |
| 7,359,393 B1 | 4/2008 | Nalawade et al. |
| 7,366,829 B1 | 4/2008 | Luttrell et al. |
| 7,380,006 B2 | 5/2008 | Srinivas et al. |
| 7,383,329 B2 | 6/2008 | Erickson |
| 7,383,348 B2 | 6/2008 | Seki et al. |
| 7,388,844 B1 | 6/2008 | Brown et al. |
| 7,389,357 B2 | 6/2008 | Duffie et al. |
| 7,389,393 B1 | 6/2008 | Karr et al. |
| 7,417,570 B2 | 8/2008 | Srinivasan et al. |
| 7,417,991 B1 | 8/2008 | Crawford et al. |
| 7,420,992 B1 | 9/2008 | Fang et al. |
| 7,428,573 B2 | 9/2008 | McCanne et al. |
| 7,441,039 B2 | 10/2008 | Bhardwaj |
| 7,451,237 B2 | 11/2008 | Takekawa et al. |
| 7,453,379 B2 | 11/2008 | Plamondon |
| 7,454,443 B2 | 11/2008 | Ram et al. |
| 7,457,315 B1 | 11/2008 | Smith |
| 7,460,473 B1 | 12/2008 | Kodama et al. |
| 7,471,629 B2 | 12/2008 | Melpignano |
| 7,496,659 B1 | 2/2009 | Coverdill et al. |
| 7,532,134 B2 | 5/2009 | Samuels et al. |
| 7,555,484 B2 | 6/2009 | Kulkarni et al. |
| 7,571,343 B1 | 8/2009 | Xiang et al. |
| 7,571,344 B2 | 8/2009 | Hughes et al. |
| 7,587,401 B2 | 9/2009 | Yeo et al. |
| 7,596,802 B2 | 9/2009 | Border et al. |
| 7,617,436 B2 | 11/2009 | Wenger et al. |
| 7,619,545 B2 | 11/2009 | Samuels et al. |
| 7,620,870 B2 | 11/2009 | Srinivasan et al. |
| 7,624,333 B2 | 11/2009 | Langner |

(56) References Cited

U.S. PATENT DOCUMENTS

| | | | |
|---|---|---|---|
| 7,624,446 B1 | 11/2009 | Wilhelm | |
| 7,630,295 B2 | 12/2009 | Hughes et al. | |
| 7,633,942 B2 | 12/2009 | Bearden et al. | |
| 7,639,700 B1 | 12/2009 | Nabhan et al. | |
| 7,643,426 B1 | 1/2010 | Lee et al. | |
| 7,644,230 B1 | 1/2010 | Hughes et al. | |
| 7,676,554 B1 | 3/2010 | Malmskog et al. | |
| 7,698,431 B1 | 4/2010 | Hughes | |
| 7,702,843 B1 | 4/2010 | Chen et al. | |
| 7,714,747 B2 | 5/2010 | Fallon | |
| 7,746,781 B1 | 6/2010 | Xiang | |
| 7,764,606 B1 | 7/2010 | Ferguson et al. | |
| 7,793,193 B2 | 9/2010 | Koch et al. | |
| 7,810,155 B1 | 10/2010 | Ravi | |
| 7,826,798 B2 | 11/2010 | Stephens et al. | |
| 7,827,237 B2 | 11/2010 | Plamondon | |
| 7,849,134 B2 | 12/2010 | McCanne et al. | |
| 7,853,699 B2 | 12/2010 | Wu et al. | |
| 7,873,786 B1 | 1/2011 | Singh et al. | |
| 7,917,599 B1 | 3/2011 | Gopalan et al. | |
| 7,924,795 B2 | 4/2011 | Wan et al. | |
| 7,925,711 B1 | 4/2011 | Gopalan et al. | |
| 7,941,606 B1 | 5/2011 | Pullela et al. | |
| 7,945,736 B2 | 5/2011 | Hughes et al. | |
| 7,948,921 B1 | 5/2011 | Hughes et al. | |
| 7,953,869 B2 | 5/2011 | Demmer et al. | |
| 7,957,307 B2 | 6/2011 | Qiu et al. | |
| 7,958,352 B2 | 6/2011 | Edgett et al. | |
| 7,970,898 B2 | 6/2011 | Clubb et al. | |
| 7,975,018 B2 | 7/2011 | Unrau et al. | |
| 7,996,747 B2 | 8/2011 | Dell et al. | |
| 8,046,667 B2 | 10/2011 | Boyce | |
| 8,069,225 B2 | 11/2011 | McCanne et al. | |
| 8,072,985 B2 | 12/2011 | Golan et al. | |
| 8,090,027 B2 | 1/2012 | Schneider | |
| 8,090,805 B1 | 1/2012 | Chawla et al. | |
| 8,095,774 B1 | 1/2012 | Hughes et al. | |
| 8,140,757 B1 | 3/2012 | Singh et al. | |
| 8,171,238 B1 | 5/2012 | Hughes et al. | |
| 8,209,334 B1 | 6/2012 | Doerner | |
| 8,225,072 B2 | 7/2012 | Hughes et al. | |
| 8,245,315 B2 * | 8/2012 | Cassett | H04L 63/14 726/28 |
| 8,271,325 B2 | 9/2012 | Silverman et al. | |
| 8,271,847 B2 | 9/2012 | Langner | |
| 8,307,115 B1 | 11/2012 | Hughes | |
| 8,312,226 B2 | 11/2012 | Hughes | |
| 8,352,608 B1 | 1/2013 | Keagy et al. | |
| 8,363,658 B1 | 1/2013 | Delker et al. | |
| 8,370,583 B2 | 2/2013 | Hughes | |
| 8,379,874 B1 | 2/2013 | Simon | |
| 8,386,797 B1 | 2/2013 | Danilak | |
| 8,392,684 B2 | 3/2013 | Hughes | |
| 8,442,052 B1 | 5/2013 | Hughes | |
| 8,447,740 B1 | 5/2013 | Huang et al. | |
| 8,473,714 B2 | 6/2013 | Hughes et al. | |
| 8,489,562 B1 | 7/2013 | Hughes et al. | |
| 8,516,158 B1 * | 8/2013 | Wu | H04L 67/5681 709/231 |
| 8,553,757 B2 | 10/2013 | Florencio et al. | |
| 8,565,118 B2 | 10/2013 | Shukla et al. | |
| 8,570,869 B2 | 10/2013 | Ojala et al. | |
| 8,576,816 B2 | 11/2013 | Lamy-Bergot et al. | |
| 8,595,314 B1 | 11/2013 | Hughes | |
| 8,613,071 B2 | 12/2013 | Day et al. | |
| 8,681,614 B1 | 3/2014 | McCanne et al. | |
| 8,699,490 B2 | 4/2014 | Zheng et al. | |
| 8,700,771 B1 | 4/2014 | Ramankutty et al. | |
| 8,706,947 B1 | 4/2014 | Vincent | |
| 8,725,988 B2 | 5/2014 | Hughes et al. | |
| 8,732,423 B1 | 5/2014 | Hughes | |
| 8,738,865 B1 | 5/2014 | Hughes et al. | |
| 8,743,683 B1 | 6/2014 | Hughes | |
| 8,755,381 B2 | 6/2014 | Hughes et al. | |
| 8,775,413 B2 | 7/2014 | Brown et al. | |
| 8,811,431 B2 | 8/2014 | Hughes | |
| 8,843,627 B1 | 9/2014 | Baldi et al. | |
| 8,850,324 B2 | 9/2014 | Clemm et al. | |
| 8,885,632 B2 | 11/2014 | Hughes et al. | |
| 8,891,554 B2 | 11/2014 | Biehler | |
| 8,913,987 B2 * | 12/2014 | Lee | H04M 15/81 455/406 |
| 8,929,380 B1 | 1/2015 | Hughes et al. | |
| 8,929,402 B1 | 1/2015 | Hughes | |
| 8,930,650 B1 | 1/2015 | Hughes et al. | |
| 9,003,541 B1 * | 4/2015 | Patidar | G06F 21/121 713/172 |
| 9,036,662 B1 | 5/2015 | Hughes | |
| 9,054,876 B1 | 6/2015 | Yagnik | |
| 9,092,342 B2 | 7/2015 | Hughes et al. | |
| 9,106,530 B1 | 8/2015 | Wang | |
| 9,130,991 B2 | 9/2015 | Hughes | |
| 9,131,510 B2 | 9/2015 | Wang | |
| 9,143,455 B1 | 9/2015 | Hughes | |
| 9,152,574 B2 | 10/2015 | Hughes et al. | |
| 9,171,251 B2 | 10/2015 | Camp et al. | |
| 9,191,342 B2 | 11/2015 | Hughes et al. | |
| 9,202,304 B1 | 12/2015 | Baenziger et al. | |
| 9,253,277 B2 | 2/2016 | Hughes et al. | |
| 9,306,818 B2 | 4/2016 | Aumann et al. | |
| 9,307,442 B2 | 4/2016 | Bachmann et al. | |
| 9,363,248 B1 | 6/2016 | Hughes | |
| 9,363,309 B2 | 6/2016 | Hughes | |
| 9,380,094 B2 | 6/2016 | Florencio et al. | |
| 9,397,951 B1 | 7/2016 | Hughes | |
| 9,438,538 B2 | 9/2016 | Hughes et al. | |
| 9,549,048 B1 | 1/2017 | Hughes | |
| 9,584,403 B2 | 2/2017 | Balasubramanian et al. | |
| 9,584,414 B2 | 2/2017 | Sung et al. | |
| 9,613,071 B1 | 4/2017 | Hughes | |
| 9,626,224 B2 | 4/2017 | Hughes et al. | |
| 9,647,949 B2 | 5/2017 | Varki et al. | |
| 9,712,463 B1 | 7/2017 | Hughes et al. | |
| 9,716,644 B2 | 7/2017 | Wei et al. | |
| 9,717,021 B2 | 7/2017 | Hughes et al. | |
| 9,875,344 B1 | 1/2018 | Hughes et al. | |
| 9,906,630 B2 | 2/2018 | Hughes | |
| 9,948,496 B1 | 4/2018 | Hughes et al. | |
| 9,961,010 B2 | 5/2018 | Hughes et al. | |
| 9,967,056 B1 | 5/2018 | Hughes | |
| 10,091,172 B1 | 10/2018 | Hughes | |
| 10,164,861 B2 | 12/2018 | Hughes et al. | |
| 10,257,082 B2 | 4/2019 | Hughes | |
| 10,313,930 B2 | 6/2019 | Hughes et al. | |
| 10,326,551 B2 | 6/2019 | Hughes | |
| 10,432,484 B2 | 10/2019 | Hughes et al. | |
| 10,637,721 B2 | 4/2020 | Hughes et al. | |
| 10,719,588 B2 | 7/2020 | Hughes et al. | |
| 10,771,370 B2 | 9/2020 | Hughes et al. | |
| 10,771,394 B2 | 9/2020 | Hughes | |
| 10,805,840 B2 | 10/2020 | Hughes et al. | |
| 10,812,361 B2 | 10/2020 | Hughes et al. | |
| 2001/0026231 A1 | 10/2001 | Satoh | |
| 2001/0034712 A1 | 10/2001 | Colvin | |
| 2001/0054084 A1 | 12/2001 | Kosmynin | |
| 2002/0007413 A1 | 1/2002 | Garcia-Luna-Aceves et al. | |
| 2002/0009079 A1 | 1/2002 | Jungck et al. | |
| 2002/0010702 A1 | 1/2002 | Ajtai et al. | |
| 2002/0010765 A1 | 1/2002 | Border | |
| 2002/0040475 A1 | 4/2002 | Yap et al. | |
| 2002/0056747 A1 | 5/2002 | Matsuyama et al. | |
| 2002/0061027 A1 | 5/2002 | Abiru et al. | |
| 2002/0065998 A1 | 5/2002 | Buckland | |
| 2002/0071436 A1 | 6/2002 | Border et al. | |
| 2002/0078242 A1 | 6/2002 | Viswanath | |
| 2002/0101822 A1 | 8/2002 | Ayyagari et al. | |
| 2002/0107988 A1 | 8/2002 | Jordan | |
| 2002/0116424 A1 | 8/2002 | Radermacher et al. | |
| 2002/0129158 A1 | 9/2002 | Zhang et al. | |
| 2002/0129260 A1 | 9/2002 | Benfield et al. | |
| 2002/0131434 A1 | 9/2002 | Vukovic et al. | |
| 2002/0150041 A1 | 10/2002 | Reinshmidt et al. | |
| 2002/0159454 A1 | 10/2002 | Delmas | |
| 2002/0163911 A1 | 11/2002 | Wee et al. | |

(56) References Cited

U.S. PATENT DOCUMENTS

| | | |
|---|---|---|
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0012400 A1 | 1/2003 | McAuliffe et al. |
| 2003/0033307 A1 | 2/2003 | Davis et al. |
| 2003/0046572 A1 | 3/2003 | Newman et al. |
| 2003/0048750 A1 | 3/2003 | Kobayashi |
| 2003/0048785 A1 | 3/2003 | Calvignac et al. |
| 2003/0067940 A1 | 4/2003 | Edholm |
| 2003/0069958 A1 | 4/2003 | Jalava |
| 2003/0097592 A1 | 5/2003 | Adusumilli |
| 2003/0123481 A1 | 7/2003 | Neale et al. |
| 2003/0123671 A1 | 7/2003 | He et al. |
| 2003/0131079 A1 | 7/2003 | Neale et al. |
| 2003/0133568 A1 | 7/2003 | Stein et al. |
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0204619 A1 | 10/2003 | Bays |
| 2003/0214502 A1 | 11/2003 | Park et al. |
| 2003/0214954 A1 | 11/2003 | Oldak et al. |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0085894 A1 | 5/2004 | Wang et al. |
| 2004/0086114 A1 | 5/2004 | Rarick |
| 2004/0088376 A1 | 5/2004 | McCanne et al. |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0158644 A1 | 8/2004 | Albuquerque et al. |
| 2004/0179542 A1 | 9/2004 | Murakami et al. |
| 2004/0181679 A1 | 9/2004 | Dettinger et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0250027 A1 | 12/2004 | Heflinger |
| 2004/0255048 A1 | 12/2004 | Lev et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0055372 A1 | 3/2005 | Springer et al. |
| 2005/0055399 A1 | 3/2005 | Savchuk |
| 2005/0071453 A1 | 3/2005 | Ellis et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0177716 A1* | 8/2005 | Ginter ............... G06Q 20/04 713/157 |
| 2005/0182849 A1 | 8/2005 | Chandrayana et al. |
| 2005/0190694 A1 | 9/2005 | Ben-Nun et al. |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0220097 A1 | 10/2005 | Swami et al. |
| 2005/0235119 A1 | 10/2005 | Sechrest et al. |
| 2005/0240380 A1 | 10/2005 | Jones |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0283355 A1 | 12/2005 | Itani et al. |
| 2005/0286526 A1 | 12/2005 | Sood et al. |
| 2006/0010243 A1 | 1/2006 | Duree |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0045096 A1 | 3/2006 | Farmer et al. |
| 2006/0059171 A1 | 3/2006 | Borthakur et al. |
| 2006/0059173 A1 | 3/2006 | Hirsch et al. |
| 2006/0109805 A1 | 5/2006 | Malamal et al. |
| 2006/0117385 A1 | 6/2006 | Mester et al. |
| 2006/0136913 A1 | 6/2006 | Sameske |
| 2006/0143497 A1 | 6/2006 | Zohar et al. |
| 2006/0193247 A1 | 8/2006 | Naseh et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | Van et al. |
| 2006/0248017 A1 | 11/2006 | Koka et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0008884 A1 | 1/2007 | Tang |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1 | 3/2007 | Hughes |
| 2007/0076693 A1 | 4/2007 | Krishnaswamy |
| 2007/0076708 A1 | 4/2007 | Kolakowski et al. |
| 2007/0081513 A1 | 4/2007 | Torsner |
| 2007/0097874 A1 | 5/2007 | Hughes et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0150497 A1 | 6/2007 | De et al. |
| 2007/0160200 A1 | 7/2007 | Ishikawa et al. |
| 2007/0174428 A1 | 7/2007 | Lev et al. |
| 2007/0179900 A1 | 8/2007 | Daase et al. |
| 2007/0192863 A1 | 8/2007 | Kapoor et al. |
| 2007/0195702 A1 | 8/2007 | Yuen et al. |
| 2007/0195789 A1 | 8/2007 | Yao |
| 2007/0198523 A1 | 8/2007 | Hayim |
| 2007/0226320 A1 | 9/2007 | Hager et al. |
| 2007/0237104 A1 | 10/2007 | Alon et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0260746 A1 | 11/2007 | Mirtorabi et al. |
| 2007/0263554 A1 | 11/2007 | Finn |
| 2007/0276983 A1 | 11/2007 | Zohar et al. |
| 2007/0280245 A1 | 12/2007 | Rosberg |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0037432 A1 | 2/2008 | Cohen et al. |
| 2008/0071818 A1 | 3/2008 | Apanowicz et al. |
| 2008/0095060 A1 | 4/2008 | Yao |
| 2008/0133536 A1 | 6/2008 | Bjorner et al. |
| 2008/0133561 A1 | 6/2008 | Dubnicki et al. |
| 2008/0184081 A1 | 7/2008 | Hama et al. |
| 2008/0205445 A1 | 8/2008 | Kumar et al. |
| 2008/0217399 A1* | 9/2008 | Leblanc ............... G06Q 20/04 235/380 |
| 2008/0222044 A1* | 9/2008 | Gottlieb ............... G06F 21/10 705/59 |
| 2008/0229137 A1 | 9/2008 | Samuels et al. |
| 2008/0243992 A1 | 10/2008 | Jardetzky et al. |
| 2008/0267217 A1 | 10/2008 | Colville et al. |
| 2008/0285463 A1 | 11/2008 | Oran |
| 2008/0300887 A1* | 12/2008 | Chen ............... G06Q 20/12 705/1.1 |
| 2008/0313318 A1 | 12/2008 | Vermeulen et al. |

(56) References Cited

U.S. PATENT DOCUMENTS

| | | |
|---|---|---|
| 2008/0320151 A1 | 12/2008 | McCanne et al. |
| 2009/0006801 A1 | 1/2009 | Shultz et al. |
| 2009/0024763 A1 | 1/2009 | Stepin et al. |
| 2009/0037448 A1 | 2/2009 | Thomas |
| 2009/0060198 A1 | 3/2009 | Little |
| 2009/0063696 A1 | 3/2009 | Wang et al. |
| 2009/0063756 A1 | 3/2009 | Asipov |
| 2009/0080460 A1 | 3/2009 | Kronewitter et al. |
| 2009/0089048 A1 | 4/2009 | Pouzin |
| 2009/0092137 A1 | 4/2009 | Haigh et al. |
| 2009/0100483 A1 | 4/2009 | McDowell |
| 2009/0158417 A1 | 6/2009 | Khanna et al. |
| 2009/0168786 A1* | 7/2009 | Sarkar ............... H04L 41/5054 370/396 |
| 2009/0175172 A1 | 7/2009 | Prytz et al. |
| 2009/0182864 A1 | 7/2009 | Khan et al. |
| 2009/0183229 A1 | 7/2009 | Ohnishi |
| 2009/0204961 A1 | 8/2009 | Dehaan et al. |
| 2009/0234966 A1 | 9/2009 | Samuels et al. |
| 2009/0245114 A1 | 10/2009 | Vijayaraghavan |
| 2009/0265707 A1 | 10/2009 | Goodman et al. |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1 | 1/2010 | Brant et al. |
| 2010/0011125 A1 | 1/2010 | Yang et al. |
| 2010/0020693 A1 | 1/2010 | Thakur |
| 2010/0054142 A1 | 3/2010 | Moiso et al. |
| 2010/0070605 A1 | 3/2010 | Hughes et al. |
| 2010/0077251 A1 | 3/2010 | Liu et al. |
| 2010/0082545 A1 | 4/2010 | Bhattacharjee et al. |
| 2010/0085964 A1 | 4/2010 | Weir et al. |
| 2010/0115137 A1 | 5/2010 | Kim et al. |
| 2010/0121957 A1 | 5/2010 | Roy et al. |
| 2010/0124239 A1 | 5/2010 | Hughes |
| 2010/0131957 A1 | 5/2010 | Kami |
| 2010/0150158 A1 | 6/2010 | Cathey et al. |
| 2010/0169467 A1 | 7/2010 | Shukla et al. |
| 2010/0177663 A1 | 7/2010 | Johansson et al. |
| 2010/0225658 A1 | 9/2010 | Coleman |
| 2010/0232443 A1 | 9/2010 | Pandey |
| 2010/0242106 A1 | 9/2010 | Harris et al. |
| 2010/0246584 A1 | 9/2010 | Ferguson et al. |
| 2010/0290364 A1 | 11/2010 | Black |
| 2010/0318892 A1 | 12/2010 | Teevan et al. |
| 2010/0322071 A1 | 12/2010 | Avdanin et al. |
| 2010/0333212 A1* | 12/2010 | Carpenter ............... H04L 63/10 713/185 |
| 2011/0002346 A1 | 1/2011 | Wu |
| 2011/0022812 A1 | 1/2011 | Van et al. |
| 2011/0113472 A1 | 5/2011 | Fung et al. |
| 2011/0126005 A1 | 5/2011 | Carpenter et al. |
| 2011/0131411 A1 | 6/2011 | Lin et al. |
| 2011/0154169 A1 | 6/2011 | Gopal et al. |
| 2011/0154329 A1 | 6/2011 | Arcese et al. |
| 2011/0181448 A1 | 7/2011 | Koratagere |
| 2011/0219181 A1 | 9/2011 | Hughes et al. |
| 2011/0225322 A1 | 9/2011 | Demidov et al. |
| 2011/0225647 A1 | 9/2011 | Dilley et al. |
| 2011/0258049 A1 | 10/2011 | Ramer et al. |
| 2011/0261828 A1 | 10/2011 | Smith |
| 2011/0276963 A1 | 11/2011 | Wu et al. |
| 2011/0299537 A1 | 12/2011 | Saraiya et al. |
| 2012/0005549 A1 | 1/2012 | Ichiki et al. |
| 2012/0036325 A1 | 2/2012 | Mashtizadeh et al. |
| 2012/0069131 A1 | 3/2012 | Abelow |
| 2012/0117571 A1 | 5/2012 | Davis et al. |
| 2012/0147894 A1 | 6/2012 | Mulligan et al. |
| 2012/0173759 A1 | 7/2012 | Agarwal et al. |
| 2012/0185775 A1 | 7/2012 | Clemm et al. |
| 2012/0196566 A1* | 8/2012 | Lee .................... H04M 15/80 455/408 |
| 2012/0198346 A1 | 8/2012 | Clemm et al. |
| 2012/0218130 A1 | 8/2012 | Boettcher et al. |
| 2012/0221611 A1 | 8/2012 | Watanabe et al. |
| 2012/0230345 A1* | 9/2012 | Ovsiannikov ......... H04L 47/22 370/412 |
| 2012/0239872 A1 | 9/2012 | Hughes et al. |
| 2012/0254128 A1 | 10/2012 | Bath et al. |
| 2012/0290636 A1 | 11/2012 | Kadous et al. |
| 2012/0331528 A1 | 12/2012 | Fu et al. |
| 2013/0018722 A1 | 1/2013 | Libby |
| 2013/0018765 A1 | 1/2013 | Fork et al. |
| 2013/0031642 A1* | 1/2013 | Dwivedi ............... G06F 21/105 726/29 |
| 2013/0044751 A1 | 2/2013 | Casado et al. |
| 2013/0058354 A1 | 3/2013 | Casado et al. |
| 2013/0080619 A1 | 3/2013 | Assuncao et al. |
| 2013/0083806 A1 | 4/2013 | Suarez et al. |
| 2013/0086236 A1 | 4/2013 | Baucke et al. |
| 2013/0086594 A1 | 4/2013 | Cottrell |
| 2013/0094501 A1 | 4/2013 | Hughes |
| 2013/0103655 A1 | 4/2013 | Fanghaenel et al. |
| 2013/0117494 A1 | 5/2013 | Hughes et al. |
| 2013/0121209 A1 | 5/2013 | Padmanabhan et al. |
| 2013/0141259 A1 | 6/2013 | Hazarika et al. |
| 2013/0142050 A1 | 6/2013 | Luna |
| 2013/0151273 A1* | 6/2013 | Jones .................. G16H 20/10 705/2 |
| 2013/0163594 A1 | 6/2013 | Sharma et al. |
| 2013/0212379 A1 | 8/2013 | Dixon et al. |
| 2013/0250951 A1 | 9/2013 | Koganti |
| 2013/0263125 A1 | 10/2013 | Shamsee et al. |
| 2013/0266007 A1 | 10/2013 | Kumbhare et al. |
| 2013/0282970 A1 | 10/2013 | Hughes et al. |
| 2013/0325986 A1 | 12/2013 | Brady et al. |
| 2013/0343191 A1 | 12/2013 | Kim et al. |
| 2014/0020107 A1 | 1/2014 | Dodgson et al. |
| 2014/0052864 A1 | 2/2014 | Van et al. |
| 2014/0075554 A1 | 3/2014 | Cooley |
| 2014/0086069 A1 | 3/2014 | Frey et al. |
| 2014/0101426 A1* | 4/2014 | Senthurpandi ......... G06F 21/32 713/1 |
| 2014/0108360 A1 | 4/2014 | Kunath et al. |
| 2014/0114742 A1 | 4/2014 | Lamontagne et al. |
| 2014/0123213 A1 | 5/2014 | Vank et al. |
| 2014/0157429 A1 | 6/2014 | Kinoshita et al. |
| 2014/0181381 A1 | 6/2014 | Hughes et al. |
| 2014/0269705 A1 | 9/2014 | Decusatis et al. |
| 2014/0279078 A1 | 9/2014 | Nukala et al. |
| 2014/0295815 A1* | 10/2014 | Cho .................... H04W 40/20 455/418 |
| 2014/0321290 A1 | 10/2014 | Jin et al. |
| 2014/0379937 A1 | 12/2014 | Hughes et al. |
| 2015/0033316 A1 | 1/2015 | Scarlata et al. |
| 2015/0052351 A1 | 2/2015 | Nodehi et al. |
| 2015/0058488 A1 | 2/2015 | Backholm |
| 2015/0074291 A1 | 3/2015 | Hughes |
| 2015/0074361 A1 | 3/2015 | Hughes et al. |
| 2015/0074821 A1 | 3/2015 | Hoshi |
| 2015/0078397 A1 | 3/2015 | Hughes et al. |
| 2015/0110113 A1 | 4/2015 | Levy et al. |
| 2015/0120663 A1 | 4/2015 | Le et al. |
| 2015/0127701 A1 | 5/2015 | Chu et al. |
| 2015/0135338 A1 | 5/2015 | Moskal |
| 2015/0143505 A1 | 5/2015 | Border et al. |
| 2015/0170221 A1 | 6/2015 | Shah |
| 2015/0281099 A1 | 10/2015 | Banavalikar |
| 2015/0281391 A1 | 10/2015 | Hughes et al. |
| 2015/0312054 A1 | 10/2015 | Barabash et al. |
| 2015/0334210 A1 | 11/2015 | Hughes |
| 2015/0365293 A1 | 12/2015 | Madrigal et al. |
| 2016/0014051 A1 | 1/2016 | Hughes et al. |
| 2016/0034305 A1 | 2/2016 | Shear et al. |
| 2016/0093193 A1 | 3/2016 | Silvers et al. |
| 2016/0112255 A1 | 4/2016 | Li |
| 2016/0142310 A1 | 5/2016 | Means |
| 2016/0218947 A1 | 7/2016 | Hughes et al. |
| 2016/0255000 A1 | 9/2016 | Gattani et al. |
| 2016/0255542 A1 | 9/2016 | Hughes et al. |
| 2016/0359740 A1 | 12/2016 | Parandehgheibi et al. |
| 2016/0380886 A1 | 12/2016 | Blair et al. |
| 2017/0026467 A1 | 1/2017 | Barsness et al. |
| 2017/0111692 A1* | 4/2017 | An ................... H04N 21/4622 |

(56) References Cited

U.S. PATENT DOCUMENTS

| | | |
|---|---|---|
| 2017/0149679 A1 | 5/2017 | Hughes et al. |
| 2017/0187581 A1 | 6/2017 | Hughes et al. |
| 2017/0359238 A1 | 12/2017 | Hughes et al. |
| 2018/0089994 A1 | 3/2018 | Dhondse et al. |
| 2018/0121634 A1 | 5/2018 | Hughes et al. |
| 2018/0123861 A1 | 5/2018 | Hughes et al. |
| 2018/0131711 A1 | 5/2018 | Chen et al. |
| 2018/0205494 A1 | 7/2018 | Hughes |
| 2018/0227216 A1 | 8/2018 | Hughes |
| 2018/0227223 A1 | 8/2018 | Hughes |
| 2019/0089620 A1 | 3/2019 | Hefel et al. |
| 2019/0104207 A1 | 4/2019 | Goel et al. |
| 2019/0149447 A1 | 5/2019 | Hughes et al. |
| 2019/0230038 A1 | 7/2019 | Hughes |
| 2019/0245771 A1 | 8/2019 | Wu et al. |
| 2019/0253187 A1 | 8/2019 | Hughes |
| 2019/0260683 A1 | 8/2019 | Hughes |
| 2019/0274070 A1 | 9/2019 | Hughes et al. |
| 2019/0280917 A1 | 9/2019 | Hughes et al. |
| 2020/0021506 A1 | 1/2020 | Hughes et al. |
| 2020/0213185 A1 | 7/2020 | Hughes et al. |
| 2020/0358687 A1 | 11/2020 | Hughes et al. |

OTHER PUBLICATIONS

"Decision Granting Motion to Terminate", Inter Partes Review Case No. IPR2014-00245, Feb. 7, 2018, 4 pages.

"IPsec Anti-Replay Window: Expanding and Disabling," Cisco IOS Security Configuration Guide. 2005-2006 Cisco Systems, Inc. Last updated: Sep. 12, 2006, 14 pages.

"Notice of Entry of Judgement Accompanied by Opinion", United States Court of Appeals for the Federal Circuit, Case: 15-2072, Oct. 24, 2017, 6 pages.

"Shared LAN Cache Datasheet", 1996, <http://www.lancache.com/slcdata.htm>.

Douglis, F. et al., "Application specific Delta-encoding via Resemblance Detection", Published in the 2003 USENIX Annual Technical Conference.

Final Written Decision, dated Dec. 30, 2014, Inter Partes Review Case No. IPR2013-00402.

Final Written Decision, dated Dec. 30, 2014, Inter Partes Review Case No. IPR2013-00403.

Final Written Decision, dated Jun. 9, 2015, Inter Partes Review Case No. IPR2014-00245.

Hong, B et al. "Duplicate data elimination in a SAN file system", In Proceedings of the 21st Symposium on Mass Storage Systems (MSS '04), Goddard, MD, Apr. 2004. IEEE.

Knutsson, Bjorn et al., "Transparent Proxy Signalling", Journal of Communications and Networks, vol. 3, No. 2, Jun. 2001.

Manber, Udi, "Finding Similar Files in a Large File System", TR 93-33 Oct. 1994, Department of Computer Science, University of Arizona. <http://webglimpse.net/pubs/TR93-33.pdf>. Also appears in the 1994 winter USENIX Technical Conference.

Muthitacharoen, Athicha et al., "A Low-bandwidth Network File System," 2001, in Proc. of the 18th ACM Symposium on Operating Systems Principles, Banff, Canada, pp. 174-187.

Newton, "Newton's Telecom Dictionary", 17th Ed., 2001, 5 pages.

Riverbed, "Riverbed Awarded Patent on Core WDS Technology" (available at: http://www.riverbed.com/about/news-articles/pressreleases/riverbed-awarded-patent-on-core-wds-technology.html (last visited Aug. 8, 2014)).

Riverbed, "Riverbed Introduces Market-Leading WDS Solutions for Disaster Recovery and Business Application Acceleration" (available at http://www.riverbed.com/about/news-articles/pressreleases/riverbed-introduces-market-leading-wds-solutions-fordisaster-recovery-and-business-application-acceleration.html (last visited Aug. 8, 2014)).

Riverbed, "The Riverbed Optimization System (RiOS) v4.0: A Technical Overview" (explaining "Data Security" through segmentation) (available at http://mediacms.riverbed.com/documents/TechOverview-Riverbed-RiOS_4_0.pdf (last visited Aug. 8, 2014)).

Silver Peak Systems, "The Benefits of Byte-level WAN Deduplication" (2008).

Singh et al.; "Future of Internet Security—IPSEC"; 2005; pp. 1-8.

Spring et al., "A protocol-independent technique for eliminating redundant network traffic", ACM SIGCOMM Computer Communication Review, vol. 30, Issue 4 (Oct. 2000) pp. 87-95, Year of Publication: 2000.

Tseng, Josh, "When accelerating secure traffic is not secure" (available at http://www.riverbed.com/blogs/whenaccelerati.html?&isSearch=true&pageSize=3&page=2 (last visited Aug. 8, 2014)).

You, L. L. and Karamanolis, C. 2004. "Evaluation of efficient archival storage techniques", In Proceedings of the 21st IEEE Symposium on Mass Storage Systems and Technologies (MSST).

You, L. L. et al., "Deep Store An Archival Storage System Architecture" Data Engineering, 2005. ICDE 2005. Proceedings of the 21st Inti. Conf. on Data Eng.,Tokyo, Japan, Apr. 5-8, 2005, pp. 12.

* cited by examiner

DYNAMIC MONITORING AND AUTHORIZATION OF AN OPTIMIZATION DEVICE

CROSS-REFERENCE TO RELATED APPLICATIONS

This application is a continuation of, and claims the priority benefit of, U.S. patent application Ser. No. 16/875,866 filed on May 15, 2020, now U.S. Pat. No. 10,885,156 issued on Jan. 5, 2021, which in turn is a continuation of, and claims the priority benefit of, U.S. patent application Ser. No. 15/856,669 filed on Dec. 28, 2017, now U.S. Pat. No. 10,719,588 issued on Jul. 21, 2020, which in turn is a continuation of, and claims the priority benefit of, U.S. patent application Ser. No. 14/479,131 filed on Sep. 5, 2014, now U.S. Pat. No. 9,875,344 issued on Jan. 23, 2018. The disclosures of the above-referenced applications are incorporated by reference herein in their entirety for all purposes.

TECHNICAL FIELD

This disclosure relates generally to dynamic monitoring and authorization of an optimization device deployed in a network.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Traditionally, when new software is purchased, the customer receives a key, or authentication code that they must input when the software is first installed. This verifies to the software service provider that the customer has a valid copy of the software installed on the machine. The key, or authentication code, may be a long string of letters or numbers that is difficult to remember and type in accurately. The software service provider must then keep track of the valid authentication codes, to help a customer if a code is lost. This may become cumbersome, particularly when there are lots of customers. Thus, a system is needed that simplifies the process from the customer's standpoint as well as the software service provider's standpoint.

Also, a customer may purchase a 1-year license for software or a hardware device, but may end up only using the software or device a few times. Thus, a more fluid system is needed that allows a customer to purchase and maintain a license for the software or device that is commensurate with the amount it is actually used. Also, the licensor needs a mechanism whereby they can monitor the actual usage of the software or device to ensure compliance with license terms.

Other information can also be conveyed with licensing systems. In the prior art, this is done manually, which can be error-prone and labor intensive. Thus, an automated system to convey information with license authorization is needed.

Data centers may be used to provide computing infrastructure by employing a number of computing resources and associated components, such as telecommunication equipment, networking equipment, storage systems, backup power supplies, environmental controls, and so forth. A data center may provide a variety of services (e.g., web applications, email services, and search engine services) for a number of customers simultaneously. To provide these services, the computing infrastructure of the data center may run various software applications and store business and operational data. The computing resources distributed throughout the data center may be physical machines and/or virtual machines running on a physical host.

Computing resources of a data center may transmit and receive data packets via one or more interconnected networks, such as a Wide Area Network (WAN). Physical switches and routers can be distributed throughout the WAN and configured to connect various network segments and route the data packets within the network environment. It may be desirable to optimize or otherwise transform the data packets transmitted and received via the WAN. Routing of the data packets for optimization may be performed by configuring physical switches, routers, and/or other network appliances, to reroute the data packets to a data optimization virtual machine. However, involving reconfiguration of physical network components in data optimization may be costly and require complex coordination of various organizations and departments.

While there are many optimization techniques that can be accomplished in a WAN, many of these optimization techniques for data transfer across a network require symmetric network components. For example, if data packets are encoded on the transmitting end before transmission through the network, they must be decoded on the receiving end. Optimization techniques may be deployed on specialized hardware devices, or operate as software on other hardware devices. A service provider of an optimization device needs a mechanism to ensure that a customer's usage of the optimization device is within the authorized license, and also to dynamically monitor and re-authorize the optimization device on an as-needed basis.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

A system for operation of an optimization device provided over a network is disclosed. The optimization device may require software to function in the network, for which a license needs to be purchased from the software provider.

In various embodiments, a portal may be located in a cloud. The portal may contain a database of information, such as service provider, customer name, customer's sites, and information regarding usage of the software at each site. There may be any number of portals located in the cloud. Each portal may have a database of information for a single service provider, or for any number of service providers.

When a customer initializes the software at a site for an optimization device, the customer may be prompted on the user interface to enter login information such as the name of the service provider, customer name, site, and password. Various fields may also be pre-configured such that the customer only need enter one or more fields. This, and other information, may be transmitted to the portal in an authorization request message.

After the login is successful, the optimization device receives an authorization response message from the portal. The authorization response message contains information regarding the available capability parameters for operating the optimization device. The capability parameters may be in the form of a specific time available for using the optimization device, an amount of data that can be transferred, and/or a limit rate of data that can be transferred in a specific period of time. The capability parameters may also comprise expiry parameters such as an expiry time or data limit for the optimization device, a warning time or data limit, and a refresh time or data limit.

In various embodiments, after a successful login, the device also receives site-specific configuration information from the portal to enable the customer to configure the software at their site. The site-specific configuration information may be included as part of the authorization response message, or may be in a separate message.

Upon expiration of a specified threshold, the optimization device may automatically send an updated authorization request message to the portal. The updated authorization request message may comprise information regarding the actual usage of the software and/or the time period for the usage. In response, the portal may send the optimization device an updated, authorization response message with an updated expiration time, and/or an additional allotment of data. The authorization response message may be refreshed periodically, such as hourly, or weekly, or on an as-needed basis.

In various embodiments, there may also be a firewall deployed between the portal and the optimization device. To enable the optimization device to communicate with the portal, the authorization request message may be communicated in a secure format such as HTTPS, which is permitted to transit the firewall.

In further embodiments, a device can access a remote service provider, such as a cloud-based service, by configuring the firewall at its location with specific parameters matching the firewall configuration for the cloud-based service. The firewall configuration information may be transmitted from the service provider to the optimization device via an authorization response message, or in a separate message, from the portal.

Furthermore, a secure data channel, such as an IPsec tunnel, may be established between the optimization device and the cloud-based service. The secure data channel may employ encryption or other network data optimization or acceleration techniques to transfer data between the optimization device and the service provider. Configuration information for the secure data channel may be transmitted to each end via the authorization request message and authorization response message from the portal. The portal may send corresponding tunnel configuration information to both ends, thereby automatically configuring a secure data channel between the optimization device at the customer site and the service provider in the cloud, without the need for any firewall configuration.

Furthermore, the software provider may be enabled to log into the portal and use the existing communications channel that has been established to remotely control and manage the optimization device, to aid in troubleshooting. In various embodiments, the customer may enable or disable the remote management feature.

In further exemplary embodiments, the above method steps may be stored on a machine-readable medium comprising instructions, which when implemented by one or more processors perform the steps of the method. In yet further examples, subsystems or devices can be adapted to perform the recited steps. Other features, examples, and embodiments are described below.

BRIEF DESCRIPTION OF THE DRAWINGS

Embodiments are illustrated by way of example, and not by limitation in the figures of the accompanying drawings, in which like references indicate similar elements.

DETAILED DESCRIPTION

The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive, or computer-readable medium.

The embodiments described herein relate to the dynamic monitoring and authorization of an optimization device deployed in a network.

Figure 1:
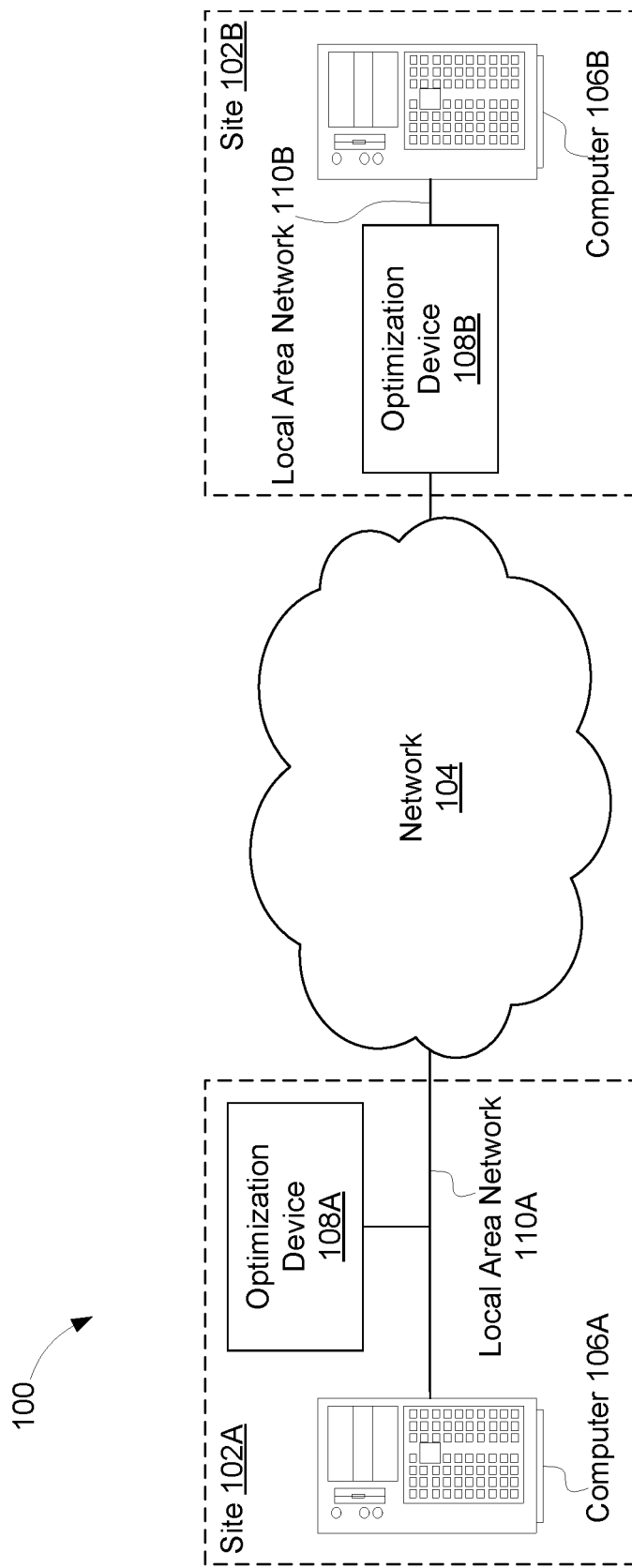
FIG. 1 is a block diagram of an exemplary environment for the operation of an optimization device.

FIG. 1 is a block diagram of an exemplary environment 100 for the operation of an optimization device. As depicted, the environment 100 includes site 102A in communication with site 102B via a network 104. Network 104 may include one or more interconnected networks, including a Wide Area Network (WAN), the Internet, Metropolitan Area Network (MAN), Backbone network, Storage Area Network (SAN), Advanced Intelligent Network (AIN), Local Area Network (LAN), Personal Area Network (PAN), and so forth. The network 104 may comprise a private network (e.g., a leased line network) or a public network (e.g., the Internet). The network 104 may include hardware and/or software elements that enable the exchange of information between the site 102A and the site 102B. Routers or switches may be used to connect the network 104 with the sites 102A and 102B, and local area networks thereof (e.g., the local area networks 110A and 110B).

Although two sites, the site 102A and the site 102B, are shown in FIG. 1, the environment 100 may comprise three or more sites and still fall within the scope of embodiments of the present invention. There may also only be one site within the scope of embodiments of the present invention. The site 102A includes a computer 106A and an optimization device 108A coupled by a local area network (LAN) 110A. Similarly, the site 102B includes a computer 106B and an optimization device 108B coupled by a local area network 110B. In various embodiments, the sites 102A and 102B may further include a router or switch (not shown). The router or switch may, for example, facilitate communication between the local area network 110A and the network 104, and between the local area network 110E and the network 104, which may be a wide area network. Other networking hardware may also be included in the sites 102A and 102B, as will be appreciated by those skilled in the art.

The sites 102A and 102B may comprise physical locations, such as offices, office complexes, stores, homes, and other locally networked sites. The sites 102A and 102B may transfer data there between via the network 104. In some embodiments, an application may run at one site and be accessed from another site. In such cases, application data may be transferred between the sites 102A and 102B. As discussed further herein, the data transferred between the sites 102A and 102B may be included in data packets.

The computers 106A and 106B may comprise a server, a client, a workstation, other computing devices, or the like. In some embodiments, the computers 106A and 106B may comprise other computing devices such as a personal digital assistant (PDA), a Smartphone, a pocket PC, and other various handheld or mobile devices. In some embodiments, one or both of the computers 106A and 106B may be substituted by a plurality of computers (not shown). In one embodiment, the plurality of computers may be located at one physical locale and be in communication via one or more optimization devices at the same physical locale. In accordance with some embodiments, one or more computers (e.g., the computers 106A and 106B) may be integrated with one or more optimization devices (e.g., the optimization devices 108A and 108B) as single systems.

According to exemplary embodiments, the optimization devices 108A and 108B, as well as any other optimization devices included in the environment 100, provide optimization of data to reduce the amount of information traversing the network 104. In one example, the optimization device may employ network memory to reduce the amount of information traversing the network 104 by one or more orders of magnitude enabling LAN-like performance of the network 104. This may be achieved by eliminating a need to send data over the network 104 that has been previously sent. Network memory is discussed in further detail in U.S. Pat. No. 8,312,226 issued on Nov. 13, 2012 and entitled "Network Memory Appliance for Providing Data Based on Local Accessibility". The disclosures of these patents are incorporated herein by reference.

Data optimization techniques may comprise compression/decompression, deduplication, Transmission Control Protocol (TCP) acceleration, performance enhancing proxy, packet reconstruction, error correction, or any other technique for optimizing data transfer between network appliances or devices. However, a person of ordinary skill in the art would understand that any optimization technique may be applied within the environment 100. Optimization encoding and decoding may be symmetric transformations of data, such as compression/decompression, deduplication, etc. For example, data packets that are compressed at optimization device 108A need to be decompressed at optimization device 108B. Furthermore, asymmetric optimization techniques may also be used. For example, optimization device may employ TCP or application proxying, among other methods.

The optimization devices 108A and 108B may comprise one or more of a communications interface, a processor, a memory, or storage. Exemplary embodiments of the optimization devices 108A and 108B are discussed in connection with later figures. In some embodiments, the optimizations devices 108A and 108B may also be referred to herein as 'appliances' or 'devices.'

Furthermore, the optimization devices 108A or 108B may be installed in-path (as depicted in FIG. 1 with respect to the optimization device 108A) or out-of-path (as depicted in FIG. 1 with respect to the optimization device 108B) in the local area networks 110A and 110B. The term 'in-path,' which may also be referred to as 'in-line,' describes installation configurations in which a device (e.g., the optimization devices 108A and 108B) is physically attached between two communication lines that make up some portion of the local area network. As such, for in-line installations, the optimization device 108B may be installed between one or more computers 106B and a router or switch (not shown) so that any data that flows through the local area network 110E will necessarily flow through the optimization device 108B.

The term 'out-of-path,' on the other hand, describes installation configurations in which a device (e.g., the optimization device 108A) taps into the local area network, but is not physically attached between two communication lines. In one embodiment where the optimization device 108A is installed out-of-path, the optimization device 108A is coupled to a router (not shown). A number of router protocols, such as web cache communication protocol (WCCP) and various protocols related to policy based routing (PBR), may allow the router to transparently route network traffic to the optimization device 108A. In other embodiments, optimization devices 108A and 108B may be embodied as optimization software installed on computers 106A and 106B, instead of as separate hardware devices.

The local area networks 110A and 110E may cover a relatively small geographic range, such the sites 102A and 102B, and comprise one or more of a wired network (e.g., Ethernet) or a wireless network (e.g., Wi-Fi). The local area networks 110A and 110E may include hardware and/or software elements that enable the exchange of information (e.g., voice and data) between various computers 106A and 106B, devices (e.g., the optimization devices 108A and 108B), and other networking components, such as routers and switches (not shown). While FIG. 1 depicts the optimization devices connected to the computer via a LAN, other types of networks, as discussed above, may also be used. For example, local area network 110A may actually be a wide area network, or other type of network.

Figure 2:
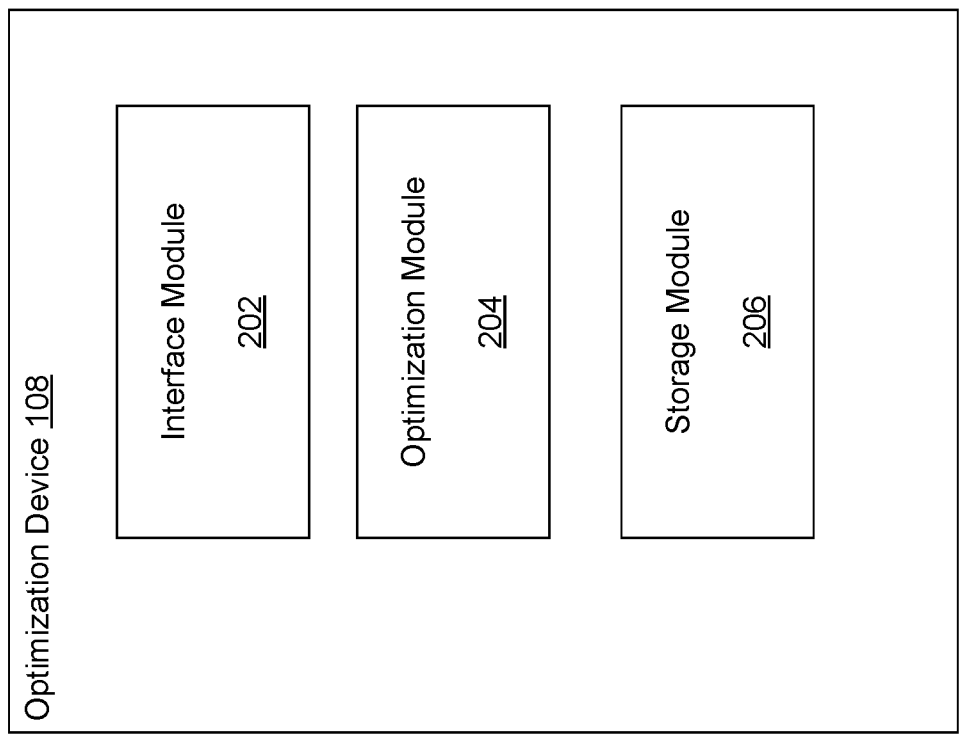
FIG. 2 illustrates an exemplary optimization device.

FIG. 2 illustrates an exemplary optimization device 108. The optimization device 108 may be similar to one or both of the optimization devices 108A and 108B. The optimization device 108 may include an interface module 202, an optimization module 204, and a storage module 206. Although FIG. 2 describes the optimization device 108 as including various modules and engines, fewer or more modules and engines may be included in the optimization device 108 and still fall within the scope of various embodiments. Additionally, various modules and engines of the optimization device 108 may be combined into a single module or engine.

The interface module 202 may be configured to facilitate communication between the optimization device 108 and one or more networks, such as local area networks 110A, 110B, or network 104. For example, information such as packets and packet data may be transferred to and from the optimization device 108 by the interface module 202. The interface module 202 may also receive information such as packets traversing a communication network, as described herein. In exemplary embodiments, the interface module 202 may be further configured to communicate with a global management system (not shown). The global management system may configure, monitor, and manage the optimization device 108 in real-time.

The optimization module 204 may perform various tasks related to the optimization device 108. For example, the optimization module 204 may be configured to store and retrieve copies of the packets, or data therefrom, received by the interface module 202. Furthermore, information stored by the optimization module 204, such as the copies of the packets, or data therefrom, may be synchronized with that of other optimization devices in communication via the network 104. Synchronization of the information may occur continuously, periodically, or after certain prompts, such as the interface module 202 receiving a packet of which a copy has not previously been stored by the optimization module 204. Exemplary methods for synchronizing the information stored by various optimization devices, such as network memory devices, are described in U.S. Pat. No. 8,489,562 issued on Jul. 16, 2013 and entitled "Deferred Data Storage," which is hereby incorporated by reference.

In exemplary embodiments, the copies of the packets may be stored in blocks by the optimization module 204. Generally speaking, a block may be a collection of consecutive bytes of data that are read from or written to a memory device (such as a disk) as a group. In some cases, the block may be further described as a unit of information comprising one or more of identification codes, data, or error-checking codes. In one embodiment, each of the blocks comprises 256 kB. Additionally, the blocks may be referred to as 'pages' or 'network memory pages.'

The optimization module 204 may also be configured to determine 'locally accessible data' of other optimization devices. The locally accessible data of a given optimization device 108 may be described as data that is transferable to a computer by the given optimization device 108 without being transferred over the network 104. Additionally, the locally accessible data may be stored internal to or external to the optimization devices 108. The optimization device 108 may maintain data structures which track which data is locally accessible at each site 102. In exemplary embodiments, the optimization device 108 may keep track of which blocks (e.g., 256 kB blocks or pages) are locally accessible at each site 102.

The optimization module 204 may further comprise a compression/decompression engine that may be configured to compress packet data from packets that are being sent from within the site that includes the optimization device 108 to a remote site across the network 104. The compression/decompression engine may be further configured to decompress the packet data from the packets that is received from the remote site. The compression and decompression of the packet may be based, at least partially, on predictions of subsequent characters.

The storage module 206 may be configured to store various types of information. For example, the storage module 206 may store copies of the packets, or data therefrom, received by the interface module 202 as local instances. The locally accessible data, in turn, may comprise the local instances and be stored by the storage module 206. The locally accessible data may be stored as blocks in exemplary embodiments. Additionally, the storage module 206 may be synchronized with storage modules of other optimization devices, as discussed herein.

In one example, again referring to FIG. 1, the interface module 202 of the optimization device 108A may receive a transferred packet sent by the computer 106A directed to the computer 106B over the network 104. The compression/decompression engine of the optimization device 108A may compress the packet data from the received packet. The compressed packet data may then be transferred over the network 104 to the optimization device 108B. Accordingly, the compression/decompression engine of the optimization device 108B may decompress the compressed packet data to obtain the packet data from the transferred packet as originally sent by the computer 106A.

Figure 3:
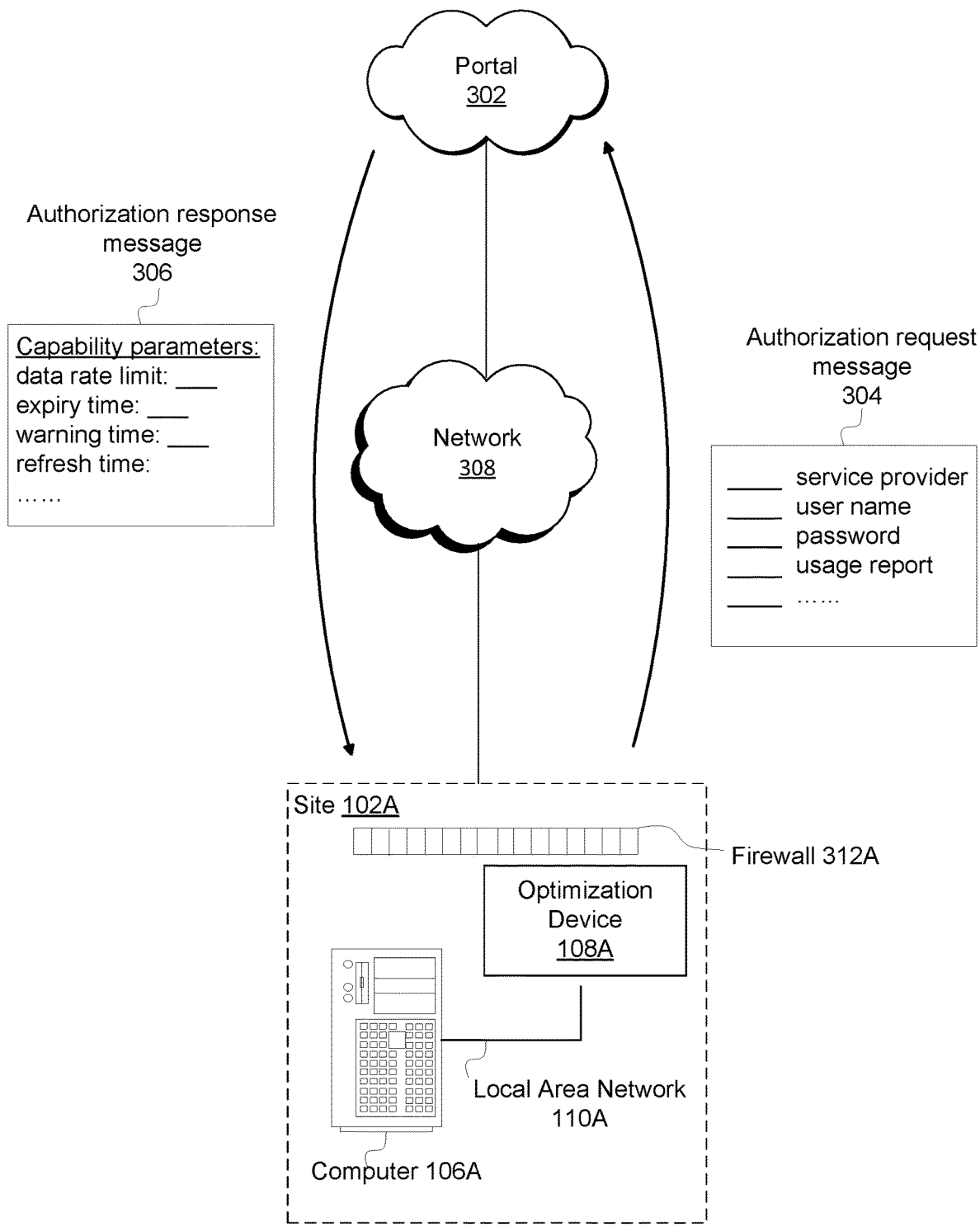
FIG. 3 depicts an exemplary environment for dynamic monitoring and authorization of an optimization device via a portal.

FIG. 3 depicts an exemplary environment for dynamic monitoring and authorization of an optimization device via a portal. In FIG. 3, optimization device 108A is connected to a portal 302 through the network 308. The portal 302 may maintain information about the authorization of the optimization device 108A and receive information regarding its usage. The portal 302 may be located in a cloud, or in any other central location accessible to all optimization devices connected to one another via an overlay network. Portal 302 may provide service to multiple optimization devices simultaneously. In various embodiments, the portal 302 contains a database of information, such as service provider, customer name, information regarding the customer's sites, and usage of the optimization software at each site. Fewer or additional fields may also be stored in the database of information. There may be any number of portals located in the cloud. Each portal may have a database of information for a single service provider, or for any number of service providers. Additionally, the portal(s) may maintain data in other data structures other than a database, as understood by a person of ordinary skill in the art.

In various embodiments, portal 302 maintains information regarding authorized parameters for the operation of each optimization device. Authorized parameters for an optimization device may comprise such information as data processing capacity, data processing capacity or operation time for a specified time period (such as a specified processing capacity or operation time for a single day, week, month, or year), cumulative data processing capacity or operation time, data rate limit, operation expiry time, operation expiry data limit, operation warning time, operating warning data limit, refresh time, refresh data limit, and/or other parameters for operation of the optimization device, as will be understood by a person of ordinary skill in the art. In an exemplary embodiment, an optimization device may be authorized to process 10 GB of data, regardless of time. In other embodiments, an optimization device may be authorized to process up to 10 GB of data within a specified number of days.

When a customer initializes the optimization device 108A at a site, the customer may be prompted on the user interface to enter login information such as the name of the service provider, customer name, site, and password. Various fields may also be pre-configured such that the customer only need enter one or more fields, or none of the fields. Optimization device 108A may obtain various login fields from the user, from the software container, or a combination of both. Certain parameters for pre-configuring optimization device 108A may come from an OVA file (VMware format) and already be within the software container. At initialization, optimization device 108A software may retrieve initialization parameters from the software container. As will be understood by persons of ordinary skill in the art, an OVA file (open virtual appliance or application) is one example of a software container.

As part of the initialization process, the optimization device 108A sends the login information to the portal 302 in an authorization request message 304. The authorization request message 304 comprises information about the optimization device 108A, such as name of service provider, user name, password, any information regarding past usage, and/or other fields as will be understood by a person of ordinary skill in the art. In various embodiments, the authorization request message 304 comprises fewer or additional data items, or any combination of data items. Also, in some embodiments, the components of the authorization request message 304 may be sent over multiple messages.

The portal 302 processes the authorization request, and determines authorized parameters for optimization device 108A. Portal 302 sends an authorization response message 306 to the optimization device 108A with information regarding capability parameters for operation of optimization device 108A. The parameters permit or restrain various operations of the device, and contain information regarding one or more thresholds at which certain events occur. In exemplary embodiments, the parameters may comprise an amount of data that can be processed by the optimization device 108A, a rate limit of data that can be processed by the optimization device 108A within a specified period of time, an expiry time for the device, a time limit for the device to send a usage report to the portal 302, and/or other information. The parameters may also comprise an amount of data that can be received or transmitted by the optimization device 108A on the LAN side (through local area network 110A), and/or an amount of data that can be received or transmitted on the WAN side (through network 308). In various embodiments, the authorization response message 306 comprises fewer or additional data items, or any combination of data items, as will be understood by a person of ordinary skill in the art. The authorization response message 306 may also be comprised of multiple individual messages.

The authorization response message 306 may authorize the optimization device 108A to operate for a discrete period of time. Any discrete time period may be authorized by the authorization response message. In exemplary embodiments, the authorization response message 306 also comprises a device expiry time or data limit, warning time or data limit, and a refresh time or data limit at which the optimization device 108A should send another authorization request message before an expiry parameter is reached. For example, if optimization device 108A is authorized to process 10 GB of data before the expiry time, the authorization response message 306 may specify that the optimization device 108A should send a new authorization request message when 6 GB of data has been processed, a warning should be sent when 8 GB of data has been processed and no updated authorization response message has been received, and the optimization device 108A should be disabled when 10 GB of data has been processed without an updated authorization response message with updated capability parameters being received by the optimization device 108A.

In an exemplary embodiment, the portal 302 may receive successful login information from an optimization device 108A in an authorization request message 304 on any given date, such as May 1, 2014. The portal 302 may contain information that the device is authorized to operate for one year, i.e. until Apr. 30, 2015. The portal 302 may send the device an authorization response message that states that the device is authorized to operate until May 31, 2014 and must report its usage to the portal 302 by May 30, 2014.

Portal 302 may specify to optimization device 108A that its usage information must be reported back to it on a periodic schedule, when a certain threshold has been surpassed (such as a certain amount of time, specified date, or amount of data processed), or as requested by a network administrator.

Before a device's allotted authorized parameter(s) is depleted, the optimization device 108A may automatically send an updated authorization request message to the portal 302. The updated authorization request message may comprise information regarding the actual usage of the software, the time period for the usage, and/or other data items from the original authorization request message 304, as discussed above.

In response, the portal 302 may send the optimization device 108A an updated authorization response message with updated capability parameters. The updated capability parameters may comprise an additional allotment of time and/or data processing capacity for optimization device 108A. The updated authorization response message may be refreshed periodically, such as hourly, weekly, on an as-needed basis, or at a time specified by a previous authorization response message.

In exemplary embodiments, if the expiry parameter is reached before the portal 302 receives usage information from the optimization device 108A, portal 302 will not send optimization device 108A an updated authorization response message. In this case, optimization device 108A may undertake an expiry action, such as ceasing to operate and the data traffic flowing to the device through network 308 or computer 106A may be dropped. In various embodiments, the data traffic may be passed through the device without the application of any data optimization techniques, the data traffic may be forwarded to another optimization device with limited data optimization applied, or optimization device 108A may operate at a limited capacity. To extend the expiry date of optimization device 108A, the device must report its usage to the portal 302 in an updated authorization request message, or in a separate message.

In various embodiments, the authorization response message 306 may also contain configuration information from portal 302 to enable the customer at site 102A to configure systems at site 102A. The configuration information may also be applicable to multiple sites of the customer. The configuration information may be site-specific, customer-specific, or any other type of configuration information. The configuration information may be included as part of the authorization response message 306, or may be in a separate message.

In various embodiments, site 102A may also comprise a firewall 312A, deployed between the portal 302 and the optimization device 108A. The optimization device 108A sends an authorization request message 304 to portal 302 through firewall 312A. Typically, in order for the optimization device 108A to receive an authorization response message 306, the communication should be initiated by the optimization device 108A, or the firewall 312A will block the incoming message. In these embodiments, the optimization device 108A cannot receive an authorization response message until an authorization request message is first sent by the optimization device. As such, the optimization device will not continue to be authorized to operate if usage information to monitor the optimization device is not sent by optimization device 108A to portal 302.

Optimization device 108A may transmit authorization request message 304 to portal 302 in a secure format, such as an https message, or any other secure format as understood by a person of ordinary skill in the art. The secure format of the authorization request message (such as an HTTPS message) may allow the message from optimization device 108A to traverse firewall 312A. The portal 302 may also transmit the authorization response message through a secure format to optimization device 108A. The authorization response message from portal 302 can traverse firewall 312A since the request initiated from optimization device 108A.

Figure 4A:
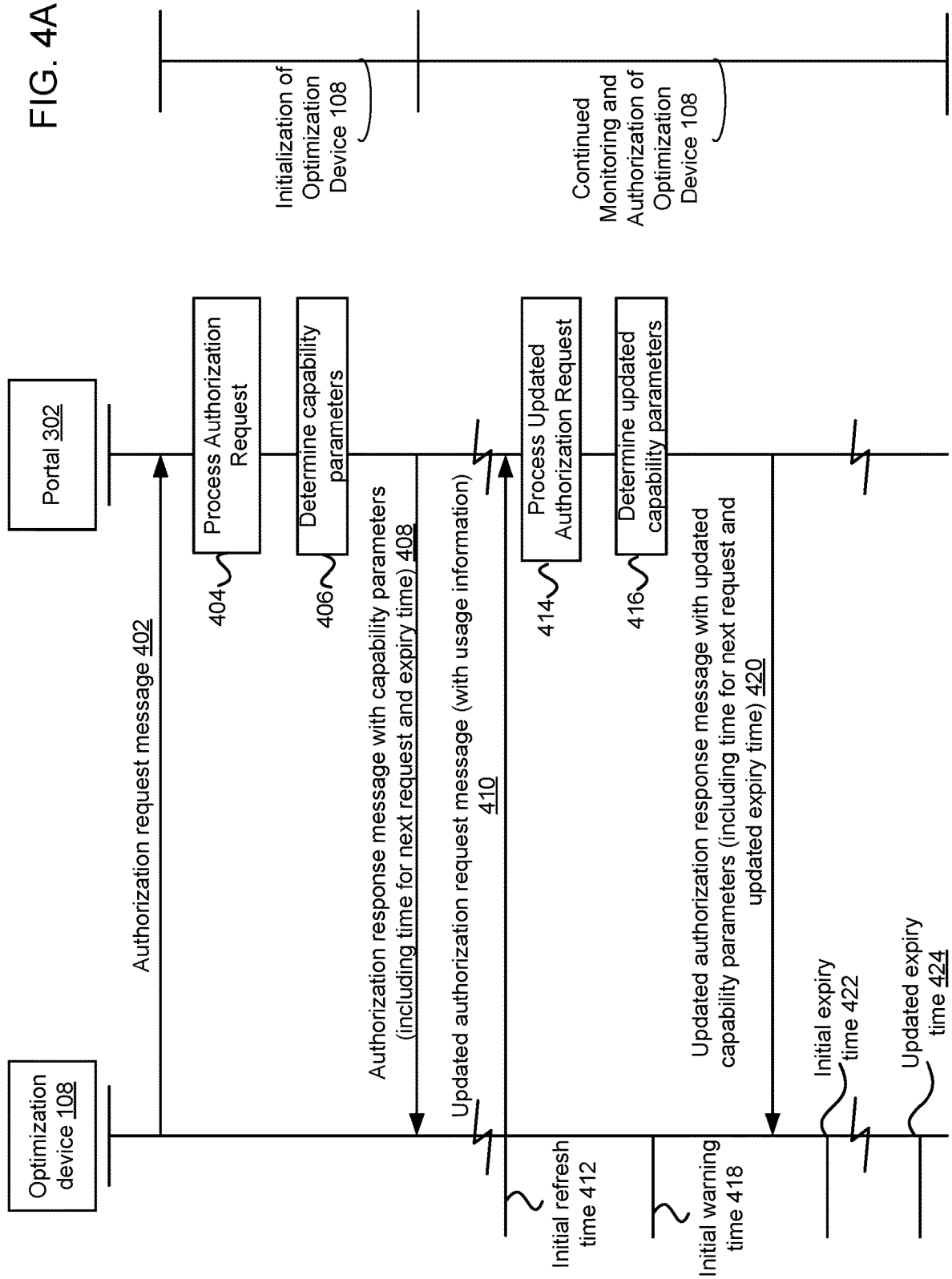
FIG. 4A depicts an exemplary message sequence chart for the dynamic monitoring and authorization of an optimization device.

FIG. 4A depicts an exemplary message sequence chart for the dynamic monitoring and authorization of an optimization device 108. In the initialization phase of optimization device 108, the device sends an authorization request message to portal 302, in step 402. Initialization may occur upon first installation of optimization device 108, or upon re-starting of the device, such as after a power failure. As discussed herein, the initial authorization request message may comprise login information such as service provider, customer name, site, and password. In step 404, portal 302 processes the authorization request, by verifying the information in the authorization request message. Portal 302 determines authorized capability parameters for optimization device 108 in step 406, and transmits an authorization response message with these capability parameters in step 408. As discussed herein, authorization response message may comprise any or all of a number of data items, including, but not limited to, a time for device 108 to send an updated authorization request (also referred to herein as a 'refresh time'), a warning time, and an expiry time for optimization device 108. These initial times are noted as initial refresh time 412, initial warning time 418, and initial expiry time 422 in the exemplary embodiment of FIG. 4A. In other embodiments, capability parameters from the authorization response message may comprise other types of thresholds in the refresh parameter, warning parameter, and expiry parameter (such as data usage limits).

After initialization, continued authorization of optimization device 108 proceeds by the optimization device 108 transmitting an updated authorization request message in step 410 to portal 302. The updated authorization request message includes usage information of the device, time, and/or other parameters as specified by the initial capability parameters. In step 414, portal 302 processes the updated authorization request, which may comprise determining that the usage information is current and within the allotted limit for the device. If the usage information is not within the allotted limit for the device, then portal 302 may or may not reply. If a reply is sent, it is with parameters to constrain further operations, as described further below in reference to FIGS. 4A and 4B. If the usage information is within the allotted limit, portal 302 determines updated capability parameters for the device in step 416, including an updated time for next authorization request (refresh time) and an updated expiry time (item 424 in FIG. 4A). Portal 302 transmits an updated authorization response message with these updated capability parameters to optimization device 108 in step 420. In order for optimization device 108 to avoid an expiry action, the device must receive the updated authorization response for continued operation before the initial expiry time 422 specified in the initial authorization response message from step 408 is reached. Updated authorization request and response messages may continue to be transmitted and received any number of times between optimization device 108 and portal 302 for continued operation of the device.

Figure 4B:
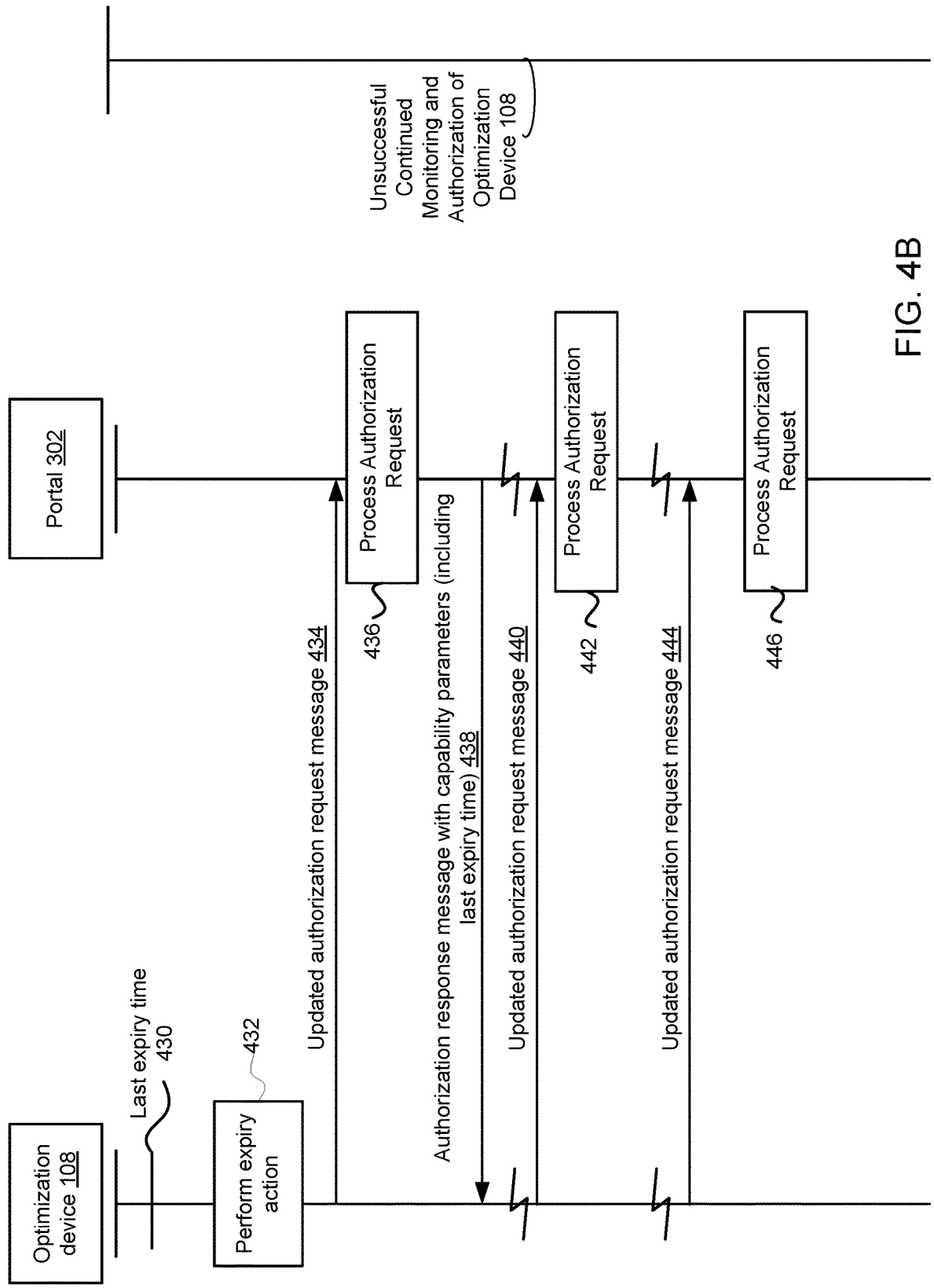
FIG. 4B depicts an exemplary message sequence chart for the unsuccessful continued authorization of an optimization device.

FIG. 4B depicts an exemplary message sequence chart for the unsuccessful continued authorization of an optimization device 108. In the exemplary embodiment depicted, a last expiry time 430 is reached before updated capability parameters are received by the optimization device 108 from portal 302. The last expiry time 430 may comprise the initial expiry time 422, updated expiry time 424, or any subsequent expiry time received by the optimization device 108 in an authorization response message from portal 302. Optimization device 108 may not receive updated capability parameters from portal 302 for any number of reasons, such as failure to transmit an updated authorization request message, failure to transmit current usage information in the updated authorization request message, a determination by portal 302 that optimization device 108 has depleted its authorized allotment for operation, or the updated authorization request or response message may have been dropped or delayed by network 308.

Since optimization device 108 is not authorized to continue to operate beyond the last expiry time 430, it performs an expiry action in step 432. As discussed herein, an expiry action may comprise the device ceasing to operate altogether, operating without any optimization, or operating at a limited capacity.

In some embodiments, optimization device 108 may continue to attempt to become operational again by sending an updated authorization request message in step 434 to portal 302. In an exemplary embodiment, portal 302 may process the authorization request in step 436 and transmit an authorization response message with capability parameters including the last expiry time 430 or some other time in the past, in step 438. Since the expiry time in the capability parameters received by the optimization device 108 is already past, the device is not authorized to continue to operate.

In another exemplary embodiment, optimization device 108 may transmit an updated authorization request message to portal 302 in step 440. Portal 302 may process the authorization request and determine that the request is deficient and optimization device 108 is not authorized to continue to operate. The request may be deficient for any number of reasons, such as not including a usage report, a usage report being outdated, or the authorized allotment of optimization device 108 having been depleted. In some embodiments, portal 302 simply does not respond to the updated authorization request message from step 440 after determining in step 442 that optimization device 108 is not authorized to continue to operate.

After failing to receive updated capability parameters, optimization device 108 may continue to send an updated authorization request message in step 444 to portal 302. Again, the portal 302 may determine in step 446 that optimization device 108 is not authorized to continue to operate, and simply not respond to the updated authorization request message from step 444. In various embodiments, after the expiry action is performed in step 432, optimization device 108 may continue to transmit an updated authorization request message to attempt to become operational again a specified number of times, at specified intervals, upon initiation by a user of the optimization device 108, or as directed by a network administrator.

Optimization device 108 may also continue to send updated authorization request messages to portal 302 at increasing intervals. For example, optimization device 108 may send updated authorization request message 434 to portal 302 at 5 minutes past the expiry action, whereas updated authorization request message 440 may be transmitted at 30 minutes past the expiry action, and updated authorization request message 444 may be transmitted at 90 minutes past the expiry action. In other embodiments, multiple days or months may transpire between optimization device 108 transmitting updated authorization request messages to portal 302.

Furthermore, as time passes, optimization device 108 may undertake progressively increasing expiry actions. For example, at a certain time limit, optimization device 108 may continue to optimize data traffic but at a limited rate. At a later time limit, optimization device 108 may simply pass network data through without applying any optimization techniques. At an even later time limit, optimization device 108 may cease to operate entirely. Even though optimization device 108 ceases to operate, it may still continue to re-authorize its operation by continuing to transmit authorization request messages to portal 302.

While the exemplary embodiment of FIG. 4B refers to capability parameters as time limits, other thresholds are also applicable as discussed herein. For example, an expiry parameter of an expiry data limit may be used, instead of expiry time.

Figure 5:
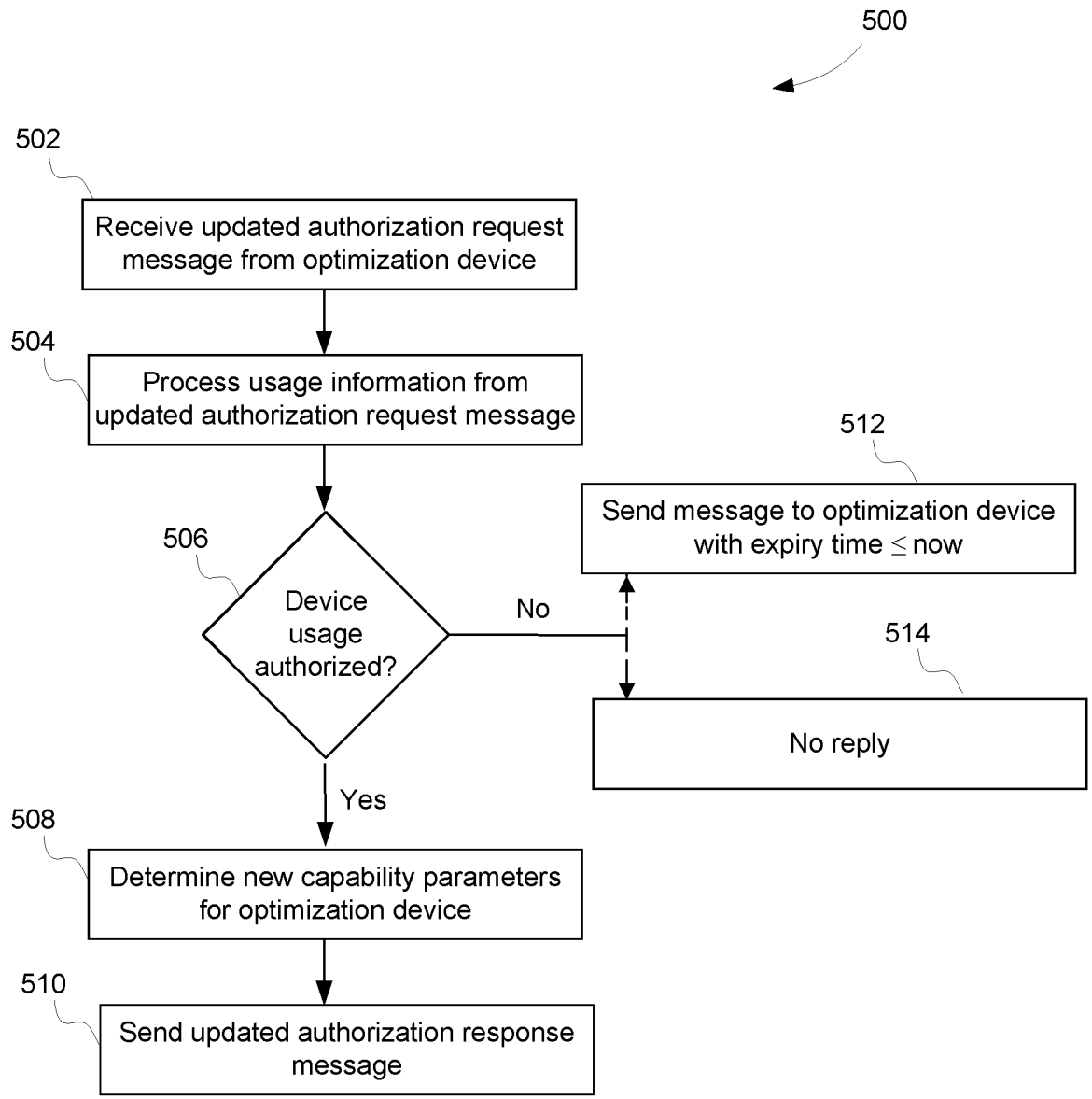
FIG. 5 is a flowchart depicting an exemplary method for the dynamic monitoring and authorization of an optimization device by a portal.

FIG. 5 is a flowchart depicting an exemplary method 500 for the dynamic monitoring and authorization of an optimization device by a portal. The method may be performed by one or more optimization devices in the network. Additionally, steps of the method may be performed in varying orders or concurrently. Furthermore, various steps may be added, removed, or combined in the method and still fall within the scope of the present invention.

In step 502, portal 302 receives an updated authorization request message from an optimization device 108. Portal 302 processes the request and determines whether the authorization request message contains current information regarding the usage of the optimization device 108, in step 504. As discussed herein, usage information can be a data amount transmitted, data amount received, data rate limit, device operation time, or any other parameter(s) for operation of the optimization device 108.

Portal 302 then determines if continued usage of optimization device 108 is authorized in step 506. Continued usage may be authorized if the updated authorization request message contains current usage information, and/or device 108 has not exceeded authorized operational limits. If continued usage of optimization device 108 is authorized, portal 302 determines new capability parameters for the device in step 508 and transmits these in an updated authorization response message to the optimization device 108 in step 510. Portal 302 then waits for the next updated authorization request message from the optimization device 108.

If continued device usage is not authorized, portal 302 may either send the optimization device 108 a response message with capability parameters that constrain operations, such as an expiry time less than or equal to the current time, in step 512. Portal 302 may also respond to optimization device 108 in other ways as well, such as with a flag or message stating that the request to continue operations is denied. As will be understood by a person of ordinary skill in the art, these are just two examples of ways that portal 302 can signal to optimization device 108 that its continued operation is not authorized. Alternatively, portal 302 may simply not reply to the request message, as depicted in step 514. Portal 302 may continue to wait for a next updated authorization request message from the optimization device 108. In exemplary embodiments, if an updated authorization request message with current usage information is not received by portal 302 within a specified time frame, the expiry time for optimization device 108 may be reached without an authorization response message being transmitted to the device. As discussed herein, optimization device 108 may then be disabled or operate at limited capacity until a new authorization response message is received by the device. While the exemplary embodiment of FIG. 5 refers to an expiry time capability parameter, other types of thresholds are also applicable as discussed herein. For example, portal 302 may determine whether device usage is authorized in step 506 based on an authorized data limit. If not, then the portal may send a message to the optimization device to constrain operations, such as with an expiry data limit less than or equal to the amount used, in step 512.

Figure 6:
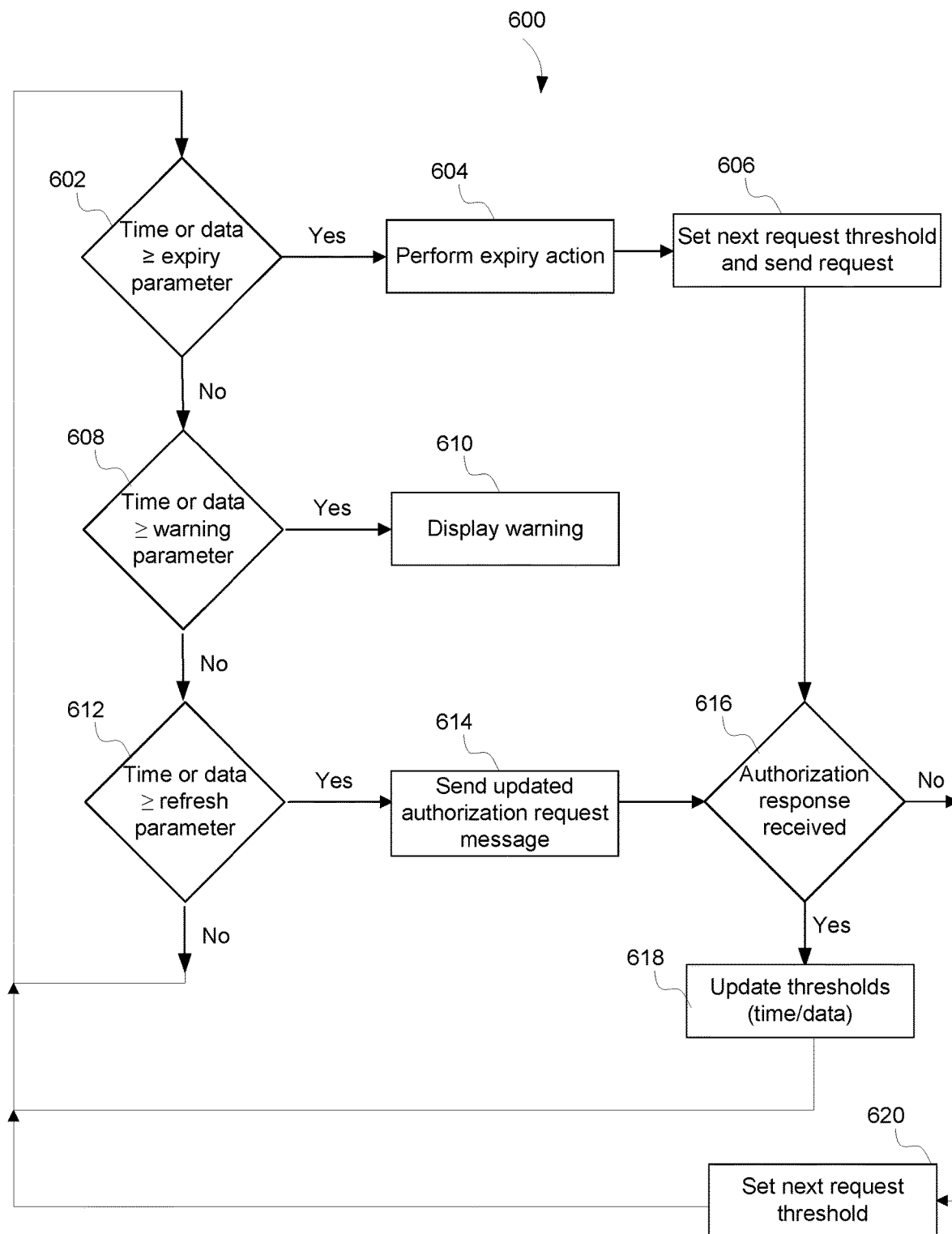
FIG. 6 is a flowchart depicting an exemplary method performed by an optimization device for continued operation.

FIG. 6 is a flowchart depicting an exemplary method 600 performed by an optimization device for continued operation. In step 602, optimization device 108 determines whether a current time or data amount used is greater than or equal to an expiry parameter determined from the most recent authorization response message received by the device. If the current time or data amount used is greater than or equal to the expiry parameter, then optimization device 108 performs an expiry action in step 604. As discussed herein, the expiry action may comprise the device ceasing to operate, or operating at a limited capacity. In step 606, optimization device 108 sets a time or data amount threshold for transmitting a next authorization request message that is greater than the current time or data amount used, and sends the request message to portal 302 at the specified time.

If the current time or data usage is not greater than or equal to the device's expiry parameter, optimization device 108 determines if the current time or data usage is greater than or equal to a warning parameter, in step 608. If so, a warning is displayed in step 610. The warning may be displayed on a graphical user interface of the optimization device 108, or may be transmitted to the user of the optimization device 108 by email, by simple network management protocol (SNMP) trap, or any other means. In exemplary embodiments, the optimization device 108 may automatically send an updated authorization request message to portal 302 if the warning threshold has been reached or exceeded.

If the current time is not greater than or equal to the device's warning parameter, optimization device 108 determines in step 612 if the current time is greater than or equal to a refresh parameter specified by the last authorization response message received by the device. If so, the device sends an updated authorization request message to portal 302 in step 614. The device may optionally also set a threshold time or data usage for a next authorization request message to be sent to the portal if no response is received.

In step 616, the device determines if an authorization response has been received from portal 302. If so, some or all threshold limits (expiry parameter, warning parameter, and refresh parameter) may be updated in step 618 in accordance with the capability parameters from the authorization response message. The device then continues to check whether any of the updated threshold limits have been exceeded by returning to step 602. If no authorization response message is received in step 616, then the device may set a threshold for sending a next request in step 620 and return to step 602 to continue to check whether the most recent threshold limits have been exceeded.

In various embodiments, optimization device 108 may continue this loop for a set number of times as determined by initial configuration settings of the optimization device 108, as specified by an authorization response message, or as directed by a network administrator.

While the exemplary embodiment of FIG. 6 has been described in terms of threshold time limits, other parameters for operating the device may also be used for the threshold limits, as understood by a person of ordinary skill in the art. For example, optimization device 108 may use data processing capacity as the parameter, and check whether the capacity has exceeded an expiry amount, warning amount, or refresh amount.

Figure 7:
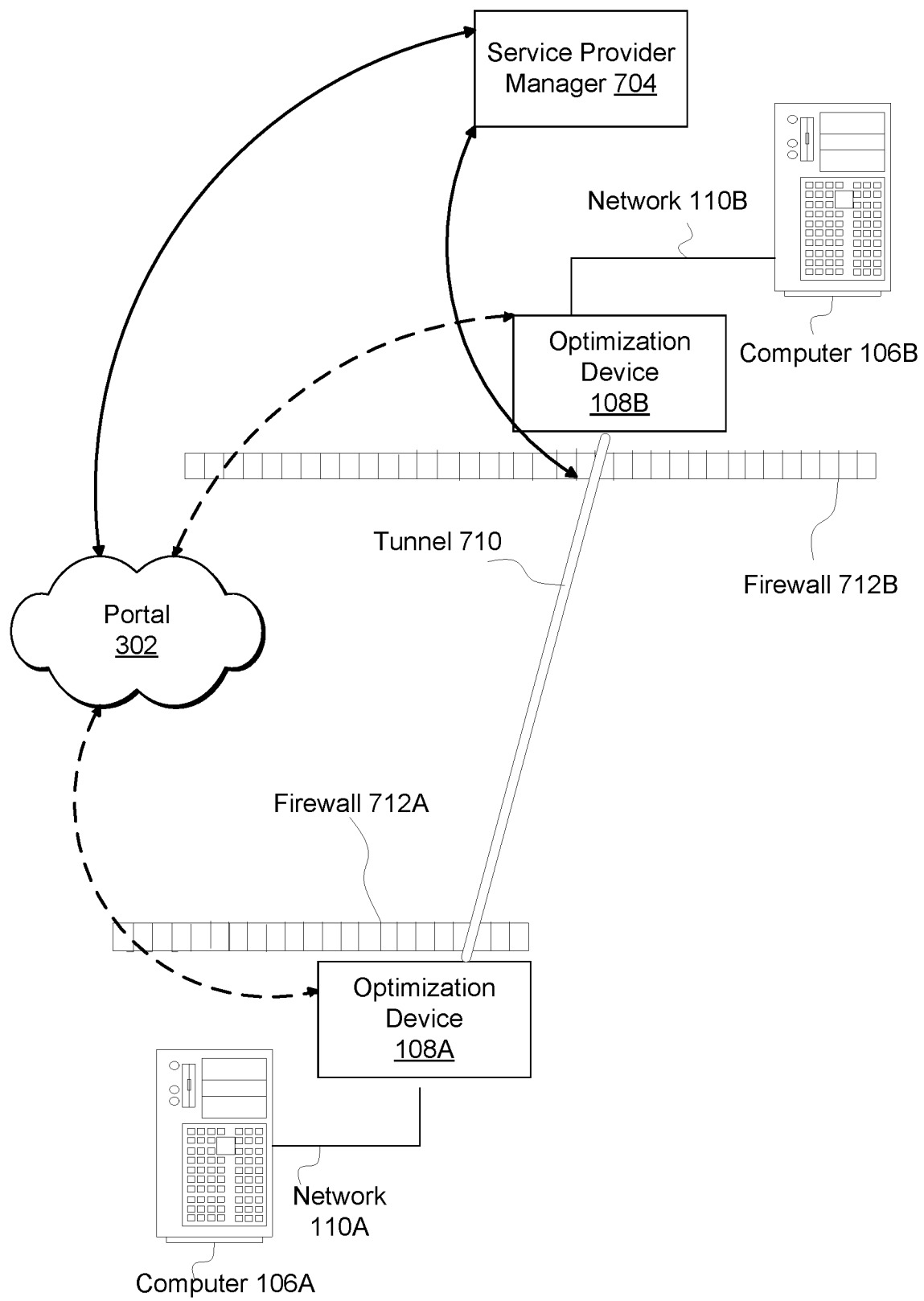
FIG. 7 depicts another exemplary environment for dynamic monitoring and authorization of an optimization device.

FIG. 7 depicts another exemplary environment for dynamic monitoring and authorization of an optimization device. In the exemplary embodiment of FIG. 7, optimization device 108A is at a customer site, and optimization device 108B is at a service provider's site. Optimization devices 108A and 108B are in communication with portal 302. In an exemplary embodiment, optimization device 108B may be located in a cloud, and the service provider may be a cloud-based service, managed by service provider manager 704 via a management interface. Communications between the various devices of FIG. 7 may occur over a network, or multiple inter-connected networks, like the Internet. As understood by a person of ordinary skill in the art, there can be any number of hops along the one or more networks connecting the various devices of FIG. 7.

In various embodiments, optimization device 108A at customer site is protected by firewall 712A. The service provider's site, including optimization device 108B, is protected by firewall 712B. Firewalls 712A and 712B may be software firewalls, or hardware firewalls. To access the service provider, firewall 712B at service provider's site needs to be configured to allow incoming data traffic from the customer using optimization device 108A.

As understood by a person of ordinary skill in the art, each firewall may be configured to allow or deny communication using any number of parameters. For example, firewall 712B may be configured to only allow incoming communication from optimization device 108A if it originates from a certain port, IP address or subnet, or the communication is of a certain protocol. Furthermore, firewall 712B may be configured to allow incoming communication from optimization device 108A only if optimization device 108B has previously sent optimization device 108A an outgoing message.

In various embodiments, optimization device 108A, optimization device 108B, and service provider manager 704 can access portal 302 using a common protocol, such as HTTP or HTTPS. Even though optimization device 108A is behind firewall 712A and optimization device 108B and service provider manager 704 are behind firewall 712B, each entity can traverse the firewalls and communicate with portal 302 if it initiates the communication with portal 302.

To enable optimization device 108A to communicate with optimization device 108B through firewall 712B, the service provider manager 704 may send firewall configuration information to portal 302, and also send corresponding firewall configuration information to firewall 712B at the service provider's site. Portal 302 may in turn send this information to optimization device 108A through an authorization response message, or in a separate message. For example, optimization device 108A sends portal 302 an authorization request message 304 to become operational, or continue to operate. As part of the authorization request message 304, or in a separate message, optimization device 108A can also request configuration information to connect to optimization device 108B at a service provider.

Portal 302 then transmits an authorization response message to optimization device 108A, authorizing the device to operate for a certain period of time. As part of the authorization response message, or in a separate message, portal 302 also transmits configuration information to optimization device 108A that specifies parameters to allow data traffic from optimization device 108A to correspond to configured parameters of firewall 712B so that optimization devices 108A and 108B can communicate with each other without being blocked by firewalls 712A and 712B.

Similarly, portal 302 may also send firewall configuration information to optimization device 108B through an authorization response message, or in a separate message. Service provider manager 704 may also configure firewall 712B directly. Since optimization device 108A and firewall 712B have compatible firewall configuration information from service provider manager 704, data traffic may also flow from optimization device 108B to optimization device 108A.

In various embodiments, a secure communications channel is also established between optimization device 108A and optimization device 108B. The channel is depicted in FIG. 7 as tunnel 710. To enable the establishment of tunnel 710, the service provider sends to portal 302 configuration information for tunnel 710 via a management interface at service provider manager 704. Portal 302 may in turn send this information to optimization device 108A in an authorization response message 306, or in a separate message. In this way, portal 302 maintains information necessary to enable the establishment of tunnel 710. Since tunnel configuration information transmitted to optimization device 108A originates from a single location (service provider manager 704), the configuration information for tunnel 710 should be compatible between the customer site and the service provider's site, facilitating the establishment of tunnel 710. This reduces the possibility of errors introduced by two independent configuration steps. As understood by a person of ordinary skill in the art, tunnel configuration information may comprise tunnel parameters, encryption keys, network addresses, or any other information to facilitate the establishment of the communication channel.

Tunnel 710 may be any type of secure communications channel, such as an SSL/TLS or Internet Protocol Security (IPsec) tunnel, and facilitates data transfer between optimization device 108A and optimization device 108B by traversing any firewalls, such as firewalls 712A and 712B. In exemplary embodiments, tunnel 710 may carry data traveling between optimization devices 108A and 108B. The data may have one or more data optimization techniques applied to it by optimization devices 108A and/or 108B as discussed herein, such as data deduplication, performance enhancing proxy, acceleration, WAN optimization, encryption, compression, etc.

In exemplary embodiments, the service provider can remotely access optimization device 108A via portal 302 to help debug any connection problems between optimization devices 108A and 108B, and manage optimization device 108A. The service provider may be able to manage optimization device 108A tunnel 710, and will not be blocked from accessing optimization device 108A by firewall 712A since tunnel 710 is already set up. Or, the service provider may manage optimization device 108A via portal 302, even if tunnel 710 is not operational or firewall 712A blocks incoming communication from the service provider. The service provider can still remotely access optimization device 108A through portal 302, since the communication channel between optimization device 108A and portal 302 is already available. In various embodiments, a user at optimization device 108A may enable or disable a remote management feature to allow or disallow a service provider from accessing optimization device 108A.

Figure 8:
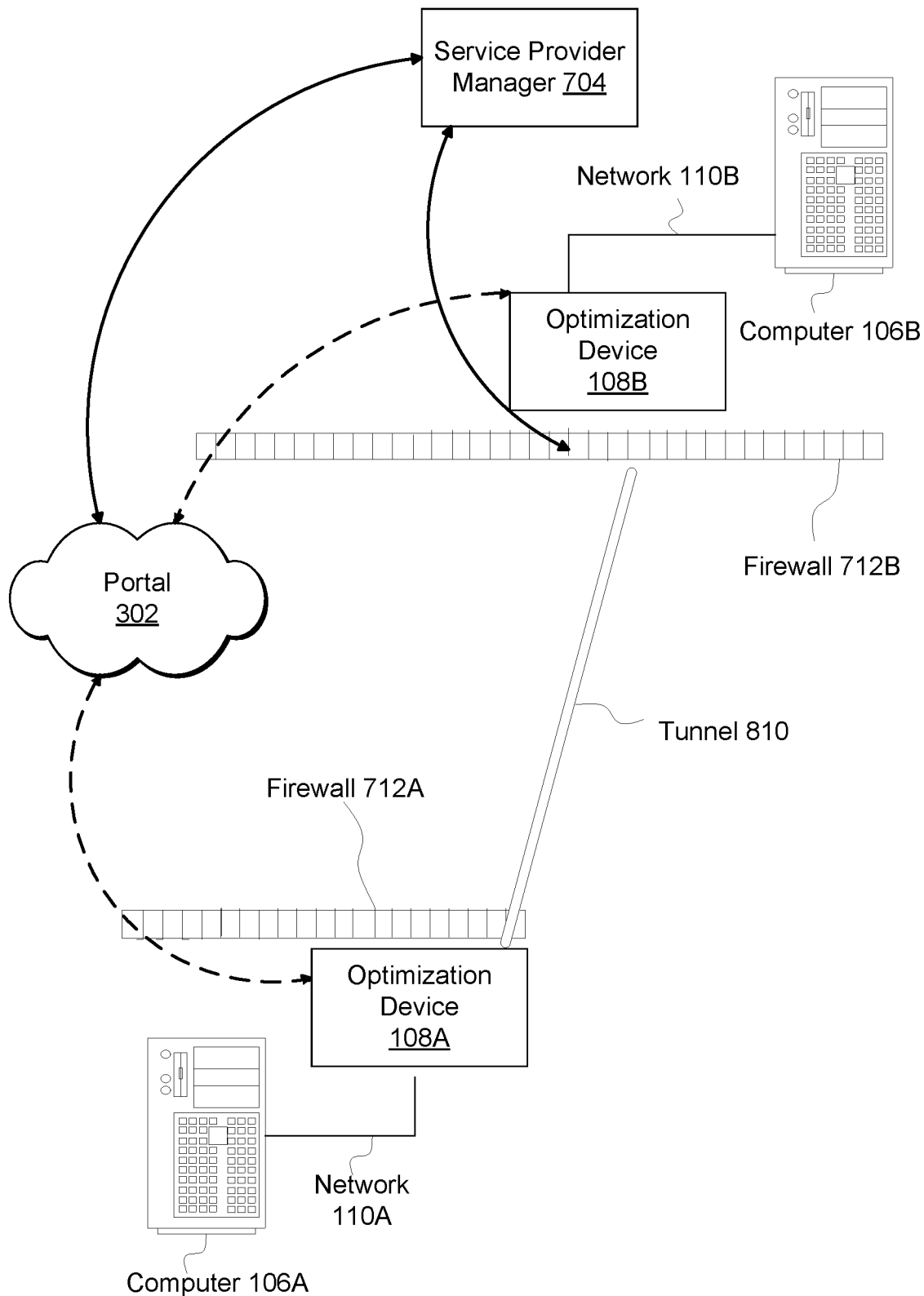
FIG. 8 depicts another exemplary environment for dynamic monitoring and authorization of an optimization device.

FIG. 8 depicts another exemplary environment for dynamic monitoring and authorization of an optimization device. In the exemplary embodiment of FIG. 8, optimization device 108A is at a customer site, and optimization device 108B is at a service provider's site. Optimization devices 108A and 108B are in communication with portal 302. In an exemplary embodiment, optimization device 108B may be located in a cloud, and the service provider may be a cloud-based service, managed by service provider manager 704 via a management interface. Communications between the various devices of FIG. 8 may occur over a network, or multiple inter-connected networks, like the Internet. As understood by a person of ordinary skill in the art, there can be any number of hops along the one or more networks connecting the various devices of FIG. 8.

In various embodiments, optimization device 108A is protected by firewall 712A. The service provider's site, including optimization device 108B, is protected by firewall 712B. Firewalls 712A and 712B may be software firewalls, or hardware firewalls. To access the service provider, firewall 712B at service provider's site needs to be configured to allow incoming data traffic from the customer using optimization device 108A.

As understood by a person of ordinary skill in the art, each firewall may be configured to allow or deny communication using any number of parameters. For example, firewall 712B may be configured to only allow incoming communication from optimization device 108A if it originates from a certain port, IP address or subnet, or the communication is of a certain protocol. Furthermore, firewall 712B may be configured to allow incoming communication from optimization device 108A only if optimization device 108B has previously sent optimization device 108A an outgoing message.

In various embodiments, optimization device 108A, optimization device 108B, and service provider manager 704 can access portal 302 using a common protocol, such as http or https. Even though optimization device 108A is behind firewall 712A and optimization device 108B and service provider manager 704 are behind firewall 712B, each entity can traverse the firewalls and communicate with portal 302 if it initiates the communication with portal 302.

To enable optimization device 108A to communicate with optimization device 108B through firewall 712B, the service provider manager 704 may send firewall configuration information to portal 302, and also send corresponding firewall configuration information to firewall 712B at the service provider's site. Portal 302 may in turn send this information to optimization device 108A through an authorization response message, or in a separate message. For example, optimization device 108A sends portal 302 an authorization request message 304 to become operational, or continue to operate. As part of the authorization request message 304, or in a separate message, optimization device 108A can also request configuration information to connect to optimization device 108B at a service provider.

Portal 302 then transmits an authorization response message to optimization device 108A, authorizing the device to operate for a certain period of time. As part of the authorization response message, or in a separate message, portal 302 also transmits configuration information to optimization device 108A that specifies parameters to allow data traffic from optimization device 108A to correspond to configured parameters of firewall 712B so that optimization devices 108A and 108B can communicate with each other without being blocked by firewalls 712A and 712B.

Similarly, portal 302 may also send firewall configuration information to optimization device 108B through an authorization response message, or in a separate message. Service provider manager 704 may also configure firewall 712B directly. Since optimization device 108A and firewall 712B have compatible firewall configuration information from service provider manager 704, data traffic may also flow from optimization device 108B to optimization device 108A.

In various embodiments, a secure communications channel is established between optimization device 108A and firewall 712B. The channel is depicted in FIG. 8 as tunnel 810. To enable the establishment of tunnel 810, the service provider sends to portal 302 configuration information for tunnel 810 via a management interface at service provider manager 704. Portal 302 may in turn send this information to optimization device 108A in an authorization response message 306, or in a separate message. In this way, portal 302 maintains information necessary to enable the establishment of tunnel 810. Similarly, service provider manager 704 may configure the firewall at the service provider's site, firewall 712B, to allow incoming traffic via tunnel 810. The firewall 712B also maintains configuration information for tunnel 810, and may also be configured to allow the creation of a VPN tunnel.

Since tunnel configuration information transmitted to optimization device 108A originates from a single location (service provider manager 704), the configuration information for tunnel 810 will be compatible at each site, facilitating the establishment of tunnel 810. As understood by a person of ordinary skill in the art, tunnel configuration information may comprise tunnel parameters, encryption keys, network addresses, or any other information to facilitate the establishment of the communication channel.

Tunnel 810 may be any type of secure communications channel, such as an SSL/TLS or Internet Protocol Security (IPsec) tunnel, and facilitates data transfer between optimization device 108A and optimization device 108B by traversing any firewalls, such as firewalls 712A and 712B. In exemplary embodiments, tunnel 810 may carry data traveling between optimization devices 108A and 108B. The data may have one or more data optimization techniques applied to it by optimization devices 108A and/or 108B as discussed herein, such as data deduplication, performance enhancing proxy, acceleration, WAN optimization, encryption, compression, etc.

Thus, methods and systems for the dynamic monitoring and authorization of an optimization device are disclosed. Although embodiments have been described with reference to specific example embodiments, it will be evident that various modifications and changes can be made to these example embodiments without departing from the broader spirit and scope of the present application. Therefore, these and other variations upon the exemplary embodiments are intended to be covered by the present disclosure. Accordingly, the specification and drawings are to be regarded in an illustrative rather than a restrictive sense.

What is claimed is:

1. A system for monitoring and authorizing operation of an optimization device in a network, comprising:
  a storage medium for storing a series of computer-executable instructions;
  a combination of microprocessors or other specially designed application-specific integrated circuits (ASICs) that are configured to execute the series of computer-executable instructions stored in the storage medium; and
  at least one portal in communication with an optimization device, wherein the series of computer-executable instructions stored in the storage medium causes the combination of microprocessors, other specially designed ASICs, or the at least one portal to:
    receive an authorization request message from the optimization device, the authorization request message comprising information identifying a customer identifier and a customer location where the optimization device is deployed;
    determine, based at least in part on the customer identifier, that the optimization device is authorized for operation;
    determine capability parameters for the optimization device, the capability parameters including a plurality of expiry parameter thresholds at which the optimization device is to report device usage information to the at least one portal; and
    transmit an authorization response message to the optimization device, the authorization response message comprising the capability parameters.

2. The system of claim 1, wherein the capability parameters for the optimization device comprise at least one of data processing capacity, amount of data processing operation time, a data rate limit for the optimization device, and an amount of optimization device operating time.

3. The system of claim 1, wherein determining the capability parameters for the optimization device comprises determining an expiry parameter, a warning parameter, and a refresh parameter.

4. The system of claim 1, wherein the plurality of expiry parameter thresholds in the capability parameters for the optimization device further comprise a warning parameter threshold and a refresh parameter threshold, where the optimization device is still authorized to operate at the warning parameter threshold and the refresh parameter threshold.

5. The system of claim 1, wherein the plurality of expiry parameter thresholds include at least a threshold for the optimization device to send an updated authorization request message and a threshold for the optimization device to cease operation.

6. The system of claim 1, wherein one of the plurality of expiry parameter thresholds is a total data processing limit for the optimization device, exceedance of which causes the optimization device to cease to operate.

7. The system of claim 1, wherein an interface module of the optimization device further facilitates communication between the optimization device and a remote software service provider via a secure data channel.

8. The system of claim 7, wherein the secure data channel is an IPsec tunnel.

9. The system of claim 1, wherein the capability parameters for the optimization device further comprise configuration information to establish a secure data channel between the optimization device and a remote software service provider.

10. The system of claim 1, wherein the device usage information for the optimization device comprises at least one of an amount or rate of data transmitted on a LAN side of the optimization device, an amount or rate of data received on the LAN side of the optimization device, an amount or rate of data transmitted on a WAN side of the optimization device, an amount or rate of data received on the WAN side of the optimization device, or an amount of operating time of the optimization device.

11. The system of claim 1, wherein the authorization request message further comprises information regarding a service provider, customer name, and password.

12. The system of claim 1, wherein the authorization request message further comprises a request to access a remote software service provider.

13. The system of claim 1, wherein the authorization response message further comprises configuration information to configure a firewall at the optimization device to access a remote software service provider.

14. The system of claim 1, wherein an optimization module further transmits data via a secure data channel between the optimization device and a second optimization device at a remote software service provider using an optimization technique.

15. The system of claim 1, wherein an optimization technique comprising at least one of compression, deduplication, performance enhancing proxy, error correction, and TCP acceleration is not used to pass data traffic through the optimization device.

16. The system of claim 1, wherein the series of computer-executable instructions stored in the storage medium causes the combination of microprocessors, other specially designed ASICs, or the at least one portal further to:
  receive an updated authorization request message from the optimization device upon expiration of at least one expiry parameter threshold, the updated authorization request message comprising an amount of usage of the optimization device;
  verify that the amount of usage in the updated authorization request message for the optimization device is within allowed limits; and
  transmit an updated authorization response message to the optimization device comprising at least one updated expiry parameter threshold for the optimization device.

17. The system of claim 16, wherein the at least one updated expiry parameter threshold is based at least in part on the amount of usage of the optimization device in the updated authorization request message.

18. The system of claim 1, wherein the series of computer-executable instructions stored in the storage medium causes the combination of microprocessors, other specially designed ASICs, or the at least one portal further to:
  receive an updated authorization request message from the optimization device, the updated authorization request message comprising information regarding a type of usage of the optimization device;

verify that the type of usage in the updated authorization request message from the optimization device is within allowed limits; and transmit an updated authorization response message to the optimization device comprising information regarding at least one updated expiry parameter threshold for the optimization device.

19. The system of claim 1, wherein the series of computer-executable instructions stored in the storage medium causes the combination of microprocessors, other specially designed ASICs, or the at least one portal further to:

receive an updated authorization request message from the optimization device upon expiration of at least one expiry parameter threshold, the updated authorization request message comprising an amount of usage of the optimization device;

verify that the amount of usage in the updated authorization request message for the optimization device is outside of allowed limits; and transmit an updated authorization response message to the optimization device comprising at least one original expiry parameter threshold for the optimization device.

20. The system of claim 1, wherein the series of computer-executable instructions stored in the storage medium causes the combination of microprocessors, other specially designed ASICs, or the at least one portal further to:

receive an updated authorization request message from the optimization device, the updated authorization request message comprising an amount of usage of the optimization device;

process information in the updated authorization request message;

determine, based at least in part on the amount of usage, that the optimization device is not authorized for further operation; and transmit an updated authorization response message to the optimization device comprising the capability parameters for the optimization device with an expiry time for the optimization device set at a past time.

\* \* \* \* \*